US009253807B2

(12) United States Patent
Nakazawa et al.

(10) Patent No.: US 9,253,807 B2
(45) Date of Patent: *Feb. 2, 2016

(54) COMMUNICATION APPARATUS THAT ESTABLISHES CONNECTION WITH ANOTHER APPARATUS BASED ON DISPLACEMENT INFORMATION OF BOTH APPARATUSES

(71) Applicants: SONY CORPORATION, Tokyo (JP); SONY MOBILE COMMUNICATIONS, INC., Tokyo (JP)

(72) Inventors: Takaki Nakazawa, Tokyo (JP); Hidekazu Watanabe, Tokyo (JP); Kenichi Toshimitsu, Tokyo (JP)

(73) Assignees: SONY CORPORATION, Tokyo (JP); SONY MOBILE COMMUNICATIONS INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/640,751

(22) Filed: Mar. 6, 2015

(65) Prior Publication Data
US 2015/0189681 A1 Jul. 2, 2015

Related U.S. Application Data

(63) Continuation of application No. 13/667,534, filed on Nov. 2, 2012, now Pat. No. 9,014,681.

(60) Provisional application No. 61/580,522, filed on Dec. 27, 2011.

(51) Int. Cl.
*H04M 3/00* (2006.01)
*H04M 1/66* (2006.01)
(Continued)

(52) U.S. Cl.
CPC ............... *H04W 76/02* (2013.01); *G06F 3/017* (2013.01); *H04M 1/7253* (2013.01);
(Continued)

(58) Field of Classification Search
CPC ..... H04W 76/02; H04W 4/008; H04W 12/04; H04W 12/06; H04W 4/027; H04W 4/026; G06F 3/017; H04M 1/7253; H04M 2250/02; H04M 2250/06; H04M 2250/12
USPC ................... 455/418–420, 41.1–41.3, 552.1, 455/456.1–456.6, 410–411
See application file for complete search history.

(56) References Cited

U.S. PATENT DOCUMENTS 8,000,721 B2 * 8/2011 Hanner ...................... 455/456.1
9,014,681 B2 * 4/2015 Nakazawa et al. ............ 455/418
(Continued)

FOREIGN PATENT DOCUMENTS

JP 2004-15558 1/2004

OTHER PUBLICATIONS

Smart-Its Friends: A Technique for Users to Easily Establish Connections Between Smart Artefacts, Internet Citation, XP009052293, Sep. 2001, Retrieved from the Internet: URL:HTTP://www.smart-its.org/publication/s mart-its-friends.ubicomp2001 .pdf).*

(Continued)

*Primary Examiner* — Brandon Miller
(74) *Attorney, Agent, or Firm* — Oblon, Spivak, McClelland, Maier & Neustadt, L.L.P.

(57) ABSTRACT

An information processing apparatus that receives, from another information processing apparatus, first displacement information; senses second displacement information corresponding to movement of the information processing apparatus; and establishes a connection with the another information processing apparatus based on a predetermined relationship between the first displacement information and the second displacement information.

19 Claims, 22 Drawing Sheets

(51) Int. Cl.
*H04W 76/02* (2009.01)
*H04W 4/02* (2009.01)
*H04M 1/725* (2006.01)
*H04W 12/04* (2009.01)
*H04W 12/06* (2009.01)
*G06F 3/01* (2006.01)
*H04W 4/00* (2009.01)

(52) U.S. Cl.
CPC ............ *H04W 4/008* (2013.01); *H04W 4/026* (2013.01); *H04W 4/027* (2013.01); *H04W 12/04* (2013.01); *H04W 12/06* (2013.01); *H04M 2250/02* (2013.01); *H04M 2250/06* (2013.01); *H04M 2250/12* (2013.01)

(56) References Cited

U.S. PATENT DOCUMENTS

| 2009/0236410 A1* | 9/2009 | Noda et al. ................ 235/375 |
| 2009/0262069 A1 | 10/2009 | Huntington |
| 2009/0265470 A1 | 10/2009 | Shen et al. |
| 2011/0237193 A1 | 9/2011 | Shen et al. |
| 2011/0256831 A1* | 10/2011 | Hsieh ....................... 455/41.2 |
| 2012/0214413 A1* | 8/2012 | Rose et al. ................. 455/41.1 |
| 2013/0084801 A1* | 4/2013 | Royston et al. ............ 455/41.1 |

OTHER PUBLICATIONS

The Extended European Search Report issued May 22, 2013, in Application No./Patent No. 12195442.4-1853.
Smart-Its Friends: a Technique for Users to Easily Establish Connetions Between SMAR Artefacts, Internet Citation, XP009052293, Sep. 2001, Retrieved from the Internet: Url:Http://www.smart-its.Or/publication/smart-its-friends.ubicomp2001.pdf.
The Extended European Search Report issued May 22, 2013, in U.S. Appl. No. 12195442.4 — 1853.
Lars Erik Holmquist, et al.; "Smart-Its Friends: a Technique for Users to Easily Establish Connections between Smart Artefacts", (internet citation ), XP009052293, Sep. 2001, Retrieved from the Internet: Url:Http//www.smart-its/org/pbulication/smart-its-frients.ubicomp2001.pdf, 6 pages.

* cited by examiner

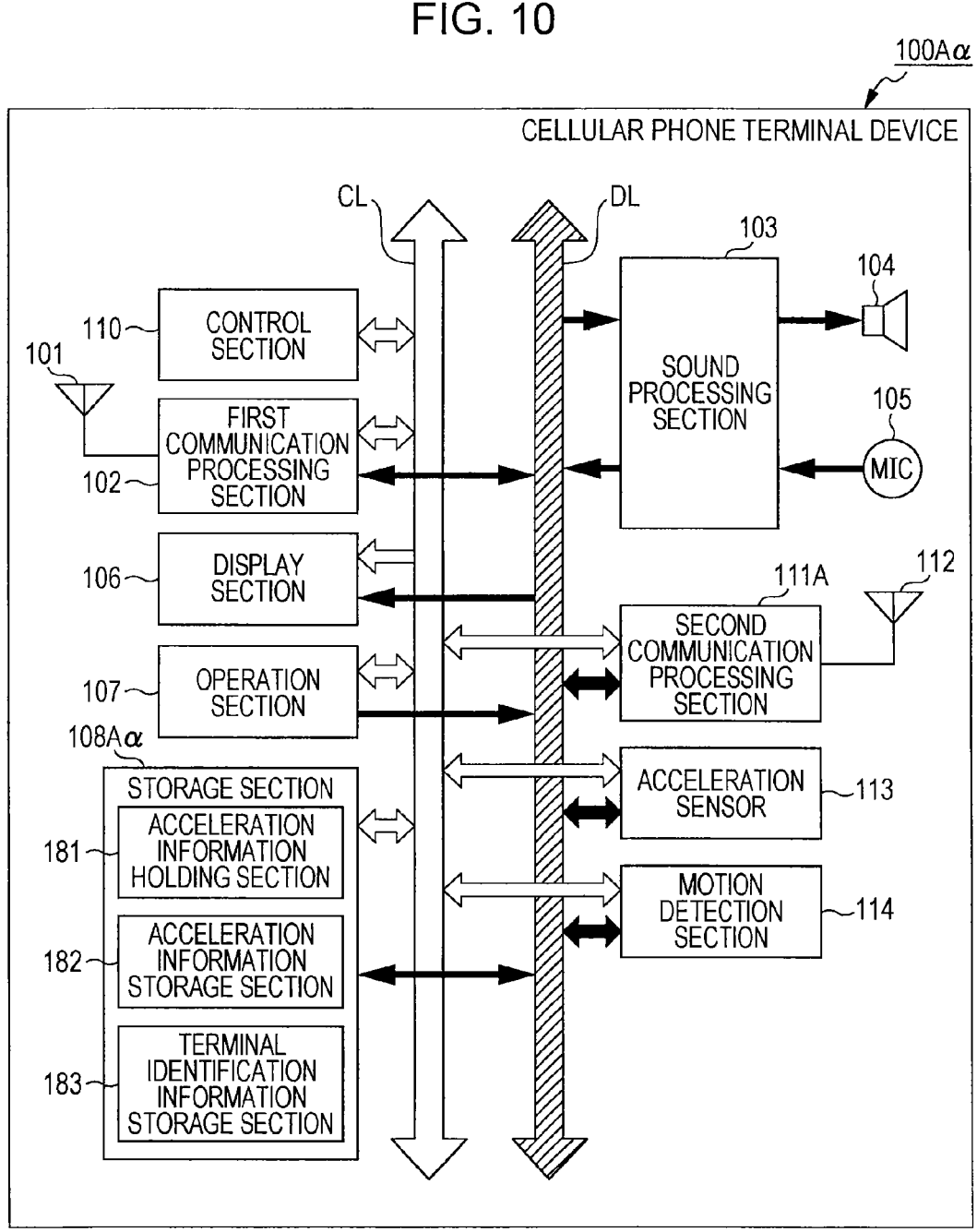

COMMUNICATION APPARATUS THAT ESTABLISHES CONNECTION WITH ANOTHER APPARATUS BASED ON DISPLACEMENT INFORMATION OF BOTH APPARATUSES

CROSS REFERENCE TO RELATED APPLICATION

This application is a continuation of U.S. Ser. No. 13/667,534, filed Nov. 2, 2013, the entire contents of which is incorporated herein by reference. U.S. Ser. No. 13/667,534 claims the benefit of priority under 119(e) of U.S. application Ser. No. 61/580,522 filed on Dec. 27, 2011.

BACKGROUND

1. Field of the Disclosure

The present disclosure relates to a technique to facilitate making settings for starting wireless communication between communication apparatuses.

2. Description of Related Art

In recent years, wireless communication such as wireless LAN and Bluetooth (registered trademark) has been increasingly used as means for communication between electronic devices such as cellular phone terminals, gaming devices, and television receivers and as means for communication between such a device and an access point. Wireless communication does not require wiring that connects between the electronic devices. Therefore, the use of wireless communication allows even a terminal device for portable use such as a cellular phone terminal to communicate with a desired electronic device. In contrast to such an advantage, wireless communication involves the risk that the content of communication may be intercepted and the risk that an outsider may invade the network.

In order to avoid such risks, an "authentication" process is normally performed for a terminal that connects to a wireless network. For example, IEEE 802.11 standards prepare two types of authentication methods, namely "Open System Authentication" and "Shared Key Authentication". In the "Open System Authentication", when a request for authentication is transmitted from a client, a device that functions as a registrar in which information on clients is registered (hereinafter simply referred to as "registrar") sends back a response including a message indicating a successful authentication or an authentication error. In the "Shared Key Authentication", keys are set for both a registrar and a client to perform authentication using a challenge-response method.

In order to further enhance the security of the wireless LAN, the authentication operation itself is occasionally encrypted. Examples of the encryption method include a WEP (Wired Equivalent Privacy) method and a WPA (Wireless Protected Access)/WPA2 method.

In order to make initial settings for starting communication as discussed above, a user is required to perform operations including checking an SSID (Service Set IDentifier) of a device to input the SSID, or selecting an SSID from a list, setting a security key such as a WEP key or a WPA key, and so forth. That is, the operations for setting authentication are troublesome. Further, technical knowledge is required to perform such operations, and therefore it is difficult for a user without such knowledge to even make settings.

In order to address such issues, a standard called WPS (Wi-Fi Protected Setup) is provided to simplify settings for registering a client in a wireless LAN. The WPS prepares two setting methods, namely a "Push Button Method" and a "PIN Code Method".

In the Push Button Method, it is necessary to provide a dedicated button to each of a registrar and a client. Then, a user pushes the dedicated buttons provided in both the registrar and the client to complete security settings using ESSID and WPA2.

In the "PIN Code Method", the PIN code assigned in advance to a registrar is registered in a client, or the PIN code generated by the client is registered in the registrar, to accomplish connection between the client and the registrar with ESSID and WPA2 set. Japanese Unexamined Patent Application Publication No. 2004-15558 describes a technique to complete connection settings just by pressing buttons provided in both devices to be connected.

In the case where the terminal such as a cellular phone terminal device, for example, is significantly small, however, it is occasionally physically difficult to provide a dedicated button. Even in the case where the space for providing a button can be secured, providing a button increases the cost of manufacture. Therefore, it is determined in most cases that providing a button is impractical. In the method in which the PIN code is input for the WPS, it is necessary to input a four-digit or eight-digit number to a device. Therefore, it may take much time for a user unaccustomed to key input to make settings. Further, the PIN code may be input erroneously, which requires a user to input the PIN code again.

In the case where the Bluetooth is used as the communication means, it is also necessary to make initial settings prior to data transmission and reception. In the Bluetooth, a process called "pairing" is performed before connection is established. In the "pairing", scanning is performed to find "connectable devices" around a terminal, and the MAC addresses and the model numbers (device names) of the detected devices are displayed in a list. Then, terminal identification information etc. is exchanged between the terminal and a device in the list selected by a user as the "device with which it is desired to communicate", thereby accomplishing the pairing. That is, the user is inevitably required to take the troublesome procedures of performing scanning to find communicable devices and selecting one of the devices using information such as MAC addresses and device names displayed in a list before starting communication.

SUMMARY

The inventor of the present disclosure recognizes the need to allow initial settings made prior to establishment of connection for wireless communication to be made through a simple operation.

According to a first embodiment, the disclosure is directed to an information processing apparatus that receives, from another information processing apparatus, first displacement information; senses second displacement information corresponding to movement of the information processing apparatus; and establishes a connection with the another information processing apparatus based on a predetermined relationship between the first displacement information and the second displacement information.

According to another exemplary embodiment, the disclosure is directed to a method performed by an information processing apparatus. The method including receiving, at an interface of the information processing apparatus, from another information processing apparatus, first displacement information; sensing second displacement information corresponding to movement of the information processing apparatus; and controlling, by a processor of the information processing apparatus, the interface to establish a connection with the another information processing apparatus based on a predetermined relationship between the first displacement information and the second displacement information.

According to another exemplary embodiment, the disclosure is directed to a non-transitory computer-readable medium including computer program instructions, which when executed by an information processing apparatus, cause the information processing apparatus to: receive, from another information processing apparatus, first displacement information; sense second displacement information corresponding to movement of the information processing apparatus; and control the interface to establish a connection with the another information processing apparatus based on a predetermined relationship between the first displacement information and the second displacement information.

According to the embodiment of the present disclosure, initial settings for wireless connection with a device that is capable of wireless communication and that is present right in front of the terminal itself can be made through an easy operation.

BRIEF DESCRIPTION OF DRAWINGS

FIG. 10 is a block diagram showing an example of the configuration of a cellular phone terminal device according to the second embodiment of the present disclosure.

DETAILED DESCRIPTION

Figure 1A:
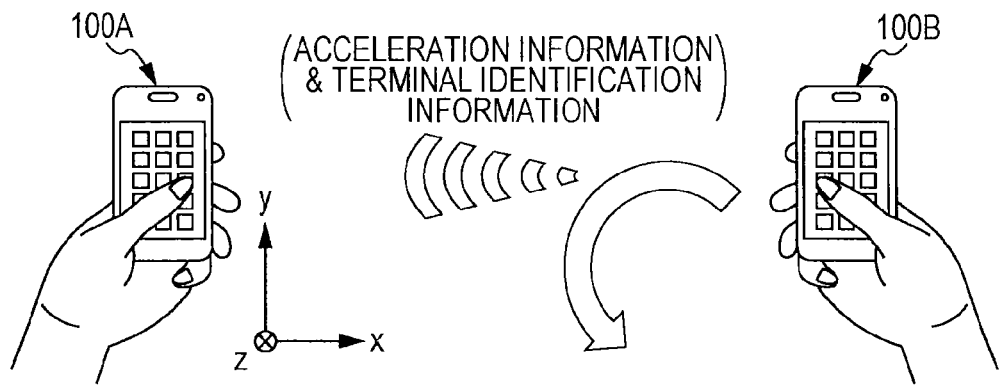
FIGS. 1A-1C are diagrams showing examples of the configuration of and the process performed by a communication system according to a first embodiment of the present disclosure.
Figure 1B:
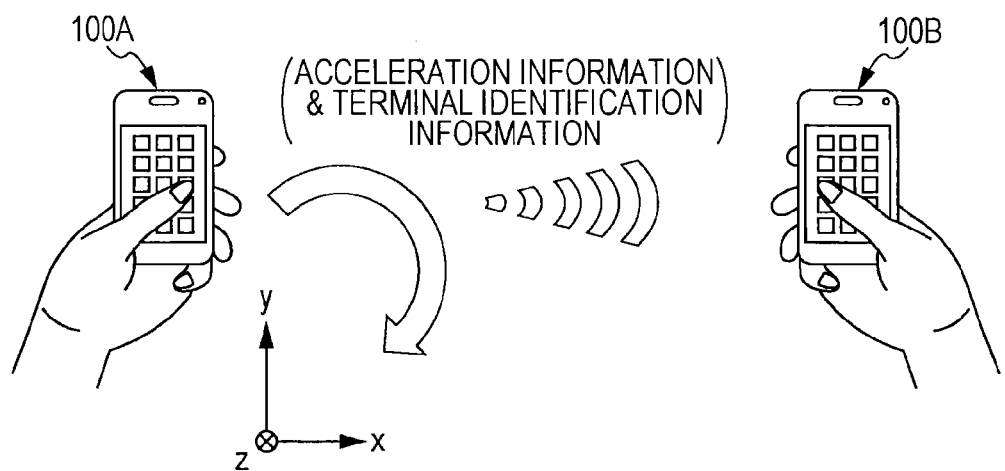
Figure 1C:
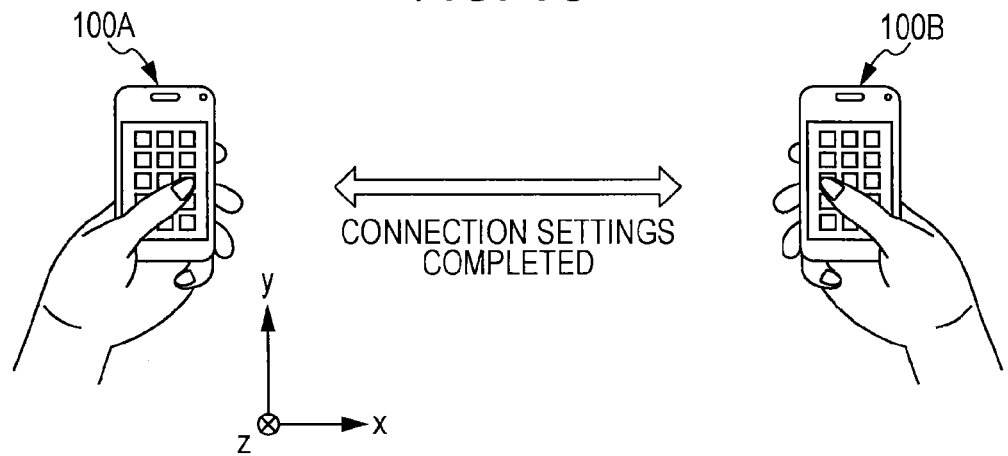

An example of a terminal device, an information processing method, and a program according to an embodiment of the present disclosure will be described below with reference to the drawings in the following order:
1. First embodiment (an example of a case where wireless connection is started in accordance with the content of a gesture for starting to make initial settings for wireless connection (hereinafter referred to as a "wireless connection starting motion"))
2. Modification of first embodiment
3. Second embodiment (an example of a case where wireless connection is started in the case where a wireless connection starting motion is performed exactly as a pattern determined in advance)
4. Third embodiment (an example of a case where wireless connection is performed using information on the direction in which a wireless connection starting motion is performed)
5. Fourth embodiment (an example of a case where authentication for wireless connection is made in accordance with the content of a gesture)
6. Various modifications 1. First Embodiment 1-1. Overview of Configuration of and Process Performed by Communication System A communication system 1 shown in FIGS. 1A-1C is formed by a cellular phone terminal device 100A serving as a communication apparatus and a cellular phone terminal device 100B serving as a second communication apparatus.

The cellular phone terminal device 100A and the cellular phone terminal device 100B have a function to perform wireless communication. A standard for wireless communication that allows wireless communication not via an access point or a router such as Wi-Fi Direct, for example, is used.

The cellular phone terminal devices 100A and 100B include an acceleration sensor serving as a displacement sensor. The acceleration sensor detects and outputs acceleration, which is the time-variation rate (time differential) of the speed. In the embodiment of the present disclosure, a 3-axis acceleration sensor capable of detecting acceleration in the directions of three axes, namely x-axis (transverse direction), y-axis (vertical direction), and z-axis (depth direction), for example, is used as the acceleration sensor. In the present disclosure, the acceleration detected along the three axes is used to determine what gesture (motion) is made by a user holding the cellular phone terminal device 100A or 100B. The acceleration sensor and the gesture determination process will be discussed in detail later.

The term "gesture" as used herein means a body motion and a hand motion consciously made by the user. In the following description, it is considered and stated that a predetermined gesture is input to a terminal in the case where the user holding the terminal makes the predetermined gesture.

In the embodiment, in the case where respective users of two cellular phone terminal devices, between which it is desired to transmit and receive data via wireless communication, input generally the same gesture to the cellular phone terminal devices, an initial setting process for wireless connection between the two terminals is started. In the example shown in FIGS. 1A-1C, the cellular phone terminal device 100A functions as a registrar (serves as a "Group Owner" specified in accordance with the Wi-Fi Direct).

First, in the case where the user makes a gesture of swinging the cellular phone terminal device 100B downward as shown in FIG. 1A, the cellular phone terminal device 100B is triggered upon detection of the gesture to set up a beacon. Acceleration information indicating the content of the gesture made by the user and terminal identification information on the cellular phone terminal device 100B such as MAC address, for example, are superimposed on the beacon. The beacon signal with such information superimposed is broadcast. In the following description, signals notifying surrounding devices of the presence of the device itself and signals transmitted as a response to such notifications, that is, various signals transferred between two terminals before a data link is established, are all referred to as "beacon (signal)".

The cellular phone terminal device 100A acquires the acceleration information and the terminal identification information sent as superimposed on the beacon, and stores the information in the terminal device 100A. Then, in the case where a predetermined gesture is input by the user, the cellular phone terminal device 100A compares acceleration information resulting from the gesture and the stored acceleration information. In the case where it is determined as a result of the comparison that the gesture input to the mating terminal, that is, the cellular phone terminal device 100B, and the gesture input to the terminal device 100A are generally the same as each other, the cellular phone terminal device 100A authenticates the cellular phone terminal device 100B.

Subsequently, as shown in FIG. 1B, the cellular phone terminal device 100A transmits terminal identification information on the device itself to the cellular phone terminal device 100B. This process ensures that the cellular phone terminal device 100A and the cellular phone terminal device 100B have recognized each other's terminal identification information. Then, a connection setting process (association) is performed between the cellular phone terminal devices 100A and 100B using each other's terminal identification information to establish a data link between the cellular phone terminal devices 100A and 100B, thereby enabling transmission of data frames (connection settings completed; see FIG. 1C).

In the embodiment, it is determined using a value obtained from the acceleration sensor what gesture (motion) is input from the user. However, the present disclosure is not limited thereto. Other sensors such as an angular speed sensor (gyro sensor) and a terrestrial magnetism sensor may also be used as the displacement sensor.

In the embodiment, the terminal devices forming the communication system 1 are the cellular phone terminal device 100A and the cellular phone terminal device 100B. However, the present disclosure is not limited thereto. The present disclosure may also be applied to other terminal devices with a wireless communication function such as television receivers, tablet terminals, personal computers, gaming devices, and audio players.

1-2. Example of Configuration of Cellular Phone Terminal Devices

Next, an example of the configuration of the cellular phone terminal device 100A and the cellular phone terminal device 100B will be described with reference to FIGS. 2 and 3. The cellular phone terminal device 100B serves as the terminal to which a gesture for starting to make connection settings is first input, and the cellular phone terminal device 100A serves as the terminal to which the same gesture as the gesture input to the cellular phone terminal device 100B is input. First, an example of the configuration of the cellular phone terminal device 100A will be described with reference to FIG. 2.

The cellular phone terminal device 100A includes an antenna 101 that transmits and receives a radio wave to and from a base station for wireless telephony, a first communication processing section 102 to which the antenna 101 is connected, and a control section 110. The cellular phone terminal device 100A also includes a sound processing section 103, a speaker 104, and a microphone 105.

The first communication processing section 102 performs wireless communication with the base station for wireless telephony under control by the control section 110. During a voice call, sound data contained in data received by the first communication processing section 102 are supplied to the sound processing section 103. Then, the sound processing section 103 performs a decoding process on the sound data to obtain an analog sound signal. The analog sound signal obtained by the sound processing section 103 is supplied to the speaker 104 to be output as a sound. A sound signal collected and obtained by the microphone 105 is also supplied to the sound processing section 103 to be encoded by the sound processing section 103 into sound data using a predetermined encoding scheme. Then, the obtained sound data are supplied to the first communication processing section 102 to be radiated as a radio wave through the antenna 101.

The respective processing sections such as the first communication processing section 102 and the sound processing section 103 exchange control data with the control section 110 via a control line CL, and transfer data via a data line DL.

The cellular phone terminal device 100A also includes a display section 106 formed by an LCD (Liquid Crystal Display), an organic EL (Electro Luminescence) display, or the like, and an operation section 107 formed by an operation key, a touch panel, or the like. The display section 106 displays information necessary to make or receive a telephone call, information such as the destination and the message of an electronic mail, an image obtained through connection to the Internet, information obtained along with execution of various functions provided by the cellular phone terminal device 100, and so forth. Display on the display section 106 is controlled by the control section 110. The operation section 107 converts the content input by the user into an operation signal to transmit the operation signal to the control section 110.

The control section 110 is formed by a microprocessor or the like, and performs communication control, sound processing and control, image processing and control, and various other signal processing and control for the respective sections. A storage section 108A formed by a non-volatile memory or the like is connected to the control section 110 via the control line CL and the data line DL. The storage section 108A stores various data required by the cellular phone terminal device 100A. The storage section 108A includes an acceleration information holding section 181, an acceleration information storage section 182, and a terminal identification information storage section 183.

The acceleration information holding section 181 is an area in which information on the acceleration detected by an acceleration sensor 113 to be discussed later is held. The acceleration information storage section 182 is an area in which the acceleration information transmitted from the mating terminal as superposed on the beacon is stored. The terminal identification information storage section 183 is an area in which the terminal identification information transmitted from the mating terminal as superposed on the beacon along with the acceleration information is stored. The process of extracting the acceleration information and the terminal identification information from packets of the beacon is performed by a second communication processing section 11A to be discussed later.

The cellular phone terminal device 100A also includes the second communication processing section 111A to which an antenna 112 is connected, the acceleration sensor 113, a motion detection section 114, and a motion determination section 115. The second communication processing section 111A performs wireless communication with surrounding devices via the antenna 112 through procedures based on a predetermined communication standard.

The acceleration sensor 113 is formed as a 3-axis acceleration sensor, for example, as discussed earlier, and detects acceleration applied in the directions of x-axis, y-axis, and z-axis of the sensor and converts the detected acceleration into a digital value to output the digital value as an acceleration value. For example, in the case where a sensor capable of detecting an acceleration of up to 2 G in each of the positive direction and the negative direction is used, the acceleration sensor 113 can acquire an acceleration value in the range from −2 G ("0x80") to +2 G ("0x7F").

The motion detection section 114 detects the content of a gesture. In the case where a gesture with some intention made by the user is input, the motion detection section 114 detects the gesture to transmit the obtained detection results to the acceleration information holding section 181 of the storage section 108A. More particularly, the motion detection section 114 calculates the characteristic amount of the gesture using acceleration values (2-dimensional acceleration vector) detected in three acceleration planes, namely x-y plane, z-x plane, and x-y plane.

Extraction of the characteristic amount of the gesture is started using, as the start point, a point at which the sign of the acceleration value is inverted and at which the amount of variation from the preceding obtained acceleration value exceeds a threshold set in advance. Then, extraction of the characteristic amount of the gesture is ended using a point at which the acceleration value becomes equal to or less than a predetermined threshold as the end point. Analyzing the acceleration values obtained at points between the start point and the end point makes it possible to extract global characteristics of the gesture input to the terminal.

For example, in the case where the user inputs a gesture of swinging the terminal upward to above his/her head and then downward, the sign of the acceleration value is inverted and the acceleration value which has been 0 or close to 0 is varied to a large value at the time when the user starts swinging the terminal upward to above his/her head. That is, extraction of the characteristic amount of the gesture is started using this point as the start point. When the user swings the terminal downward from above his/her head to a stationary state, the acceleration value becomes 0 or close to 0, and this point is detected as the end point.

The value stored in the acceleration information holding section 181 may be the acceleration value as acquired by the acceleration sensor 113. However, the acceleration value may be rounded into an approximate value to be stored. The sensitivity of an element forming the acceleration sensor may vary more or less, and therefore the detected acceleration values may be subject to individual differences. Hence, making a strict comparison between the acceleration values as detected is often impractical and insignificant.

It is assumed that the user makes a gesture of swinging the cellular phone terminal device 100A downward from above his/her head, for example. In the case where such a gesture is performed, it is predicted that acceleration with a certain magnitude or more is applied in the y-axis direction (the acceleration plane including the y-axis). That is, information on acceleration applied in the x-axis direction and the z-axis direction (x-z plane) at this time is unnecessary from the viewpoint of determining the gesture. Thus, in the case where acceleration with a certain magnitude or more is applied in the y-axis direction, the acceleration value detected in the y-axis direction is rounded to a predetermined threshold or less, and the acceleration values applied in the x-axis direction and the z-axis direction (x-z plane) are brought to zero.

A description is made using specific acceleration values. It is assumed that a threshold for y-axis (x-y plane and y-z plane) is set in advance to "0x40", and that a threshold for y-axis and z-axis (x-z plane) is set in advance to "0x20". It is then assumed that acceleration values of "0x45", "0x40", and "0x05" are detected for y-axis, x-axis, and z-axis, respectively, for example. In this case, the acceleration value for y-axis is rounded to "0x40" set as the threshold, and the acceleration values for x-axis and z-axis are stored as zero (0x00). That is, the thus generated approximate values are used as the acceleration information.

As an alternative to the approximate values obtained by rounding the acceleration values, binary information indicating whether or not a predetermined gesture is made may be used as the acceleration information. In the example discussed above, in the case where the acceleration value applied in the y-axis direction (detected in the acceleration plane including y-axis) exceeds a threshold, it is determined that the predetermined gesture is input to turn on ("1") a flag value. Further, wireless connection setting may be started when the same gesture is input a plurality of times. In this case, only the number of times that the gesture is input may be stored as the acceleration information.

The motion determination section 115 compares the acceleration information (second acceleration information) transmitted from the cellular phone terminal device 100B serving as the mating terminal and the acceleration information (first acceleration information) based on the gesture detected by the terminal device 100A to determine whether or not the two pieces of acceleration information coincide with each other. That is, the motion determination section 115 compares the acceleration values acquired by the respective terminals, or the acceleration information calculated on the basis of the acceleration values, or the binarized acceleration information (flag value), to determine whether the user of the cellular phone terminal device 100A and the user of the cellular phone terminal device 100B made the same gesture as each other. Then, the motion determination section 115 transmits the determination results to the control section 110. Even if the received acceleration information and the acceleration information input to the terminal device 100A do not perfectly coincide with each other, the motion determination section 115 may assume that a coincidence is made and proceed with the process if the difference between the two values falls within a predetermined threshold range.

The second communication processing section 111A starts transmission of the beacon on the basis of control by the control section 110 in the case where the motion determination section 115 determines that the gestures input to the two terminals are the same as each other. Then, the second communication processing section 111A superposes the acceleration information acquired by the acceleration sensor 113 and the terminal identification information on the terminal device 100A on packets of the beacon. At this time, various information required to perform communication such as SSID, information on wireless transfer rates supported, the number of the wireless channel used, and the encryption method used is also sent together.

The second communication processing section 111A also authenticates the mating terminal, along with starting transmission of the beacon, in the case where the motion determination section 115 determines that the gestures input to the two terminals are the same as each other. The term authentication as used herein refers to authentication specified as "Authentication" in the IEEE 802.11 standards, for example. Subsequently, when a request for connection is transmitted from the mating terminal, the second communication processing section 111A sends a response indicating acceptance of the request. Consequently, connection settings (initial settings) required for wireless communication between the cellular phone terminal devices 100A and 100B are completed to establish a data link. That is, transmission of data frames between the cellular phone terminal devices 100A and 100B is enabled.

Authentication that uses an encryption method such as WEP and WPA/WPA2 may be performed as required after connection settings are completed.

Next, an example of the configuration of the cellular phone terminal device 100B will be described with reference to FIG. 3. In the embodiment, the cellular phone terminal device 100B serves as the terminal to which a gesture for starting to make connection settings required for wireless communication is input. The cellular phone terminal device 100B transmits a request for connection to the cellular phone terminal device 100A using the terminal identification information on the cellular phone terminal device 100A transmitted as superposed on the beacon. Components in FIG. 3 corresponding to those in FIG. 2 are denoted by the same reference symbols to omit overlapping description.

Figure 2:
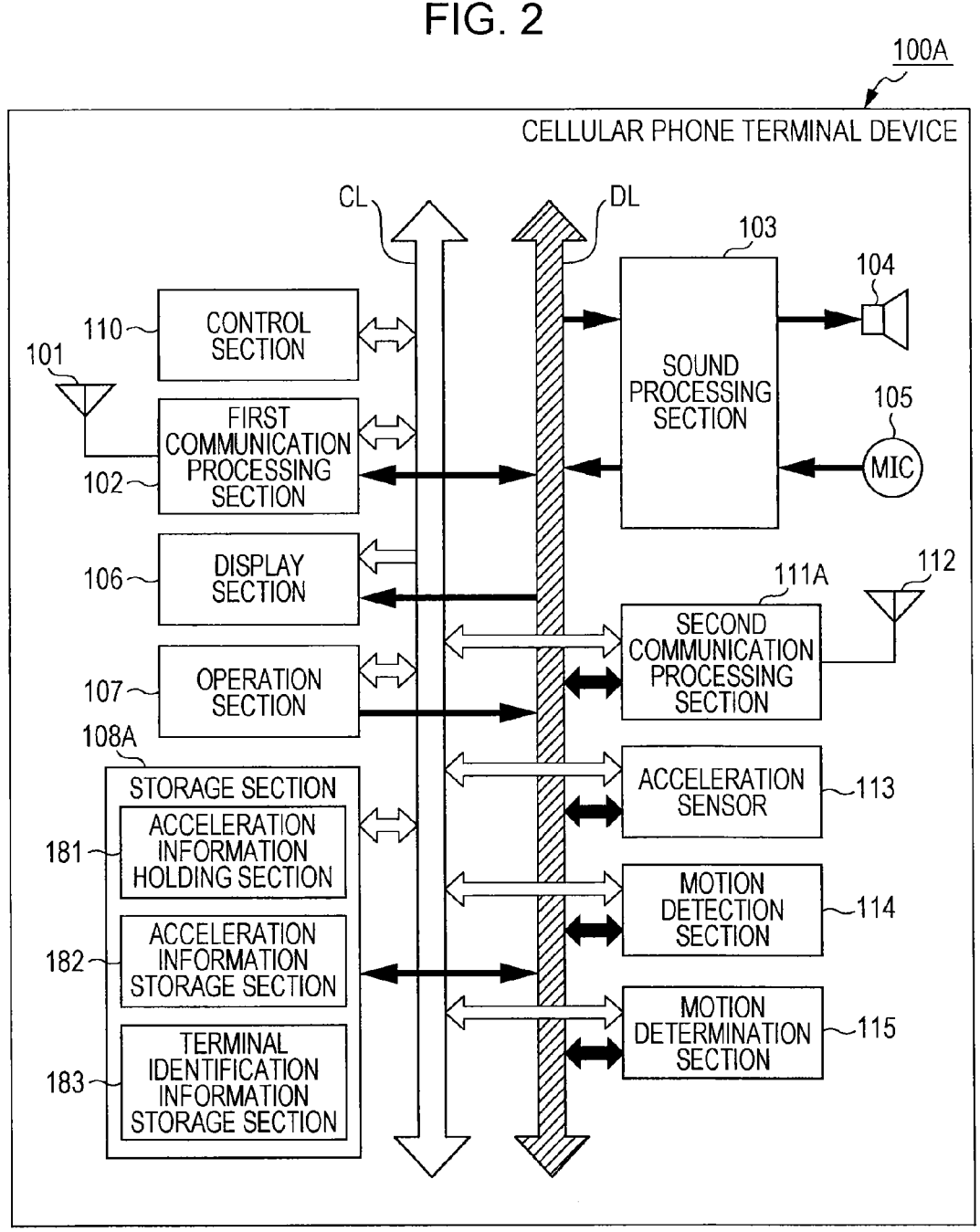
FIG. 2 is a block diagram showing an example of the configuration of a cellular phone terminal device according to the first embodiment of the present disclosure.
Figure 3:
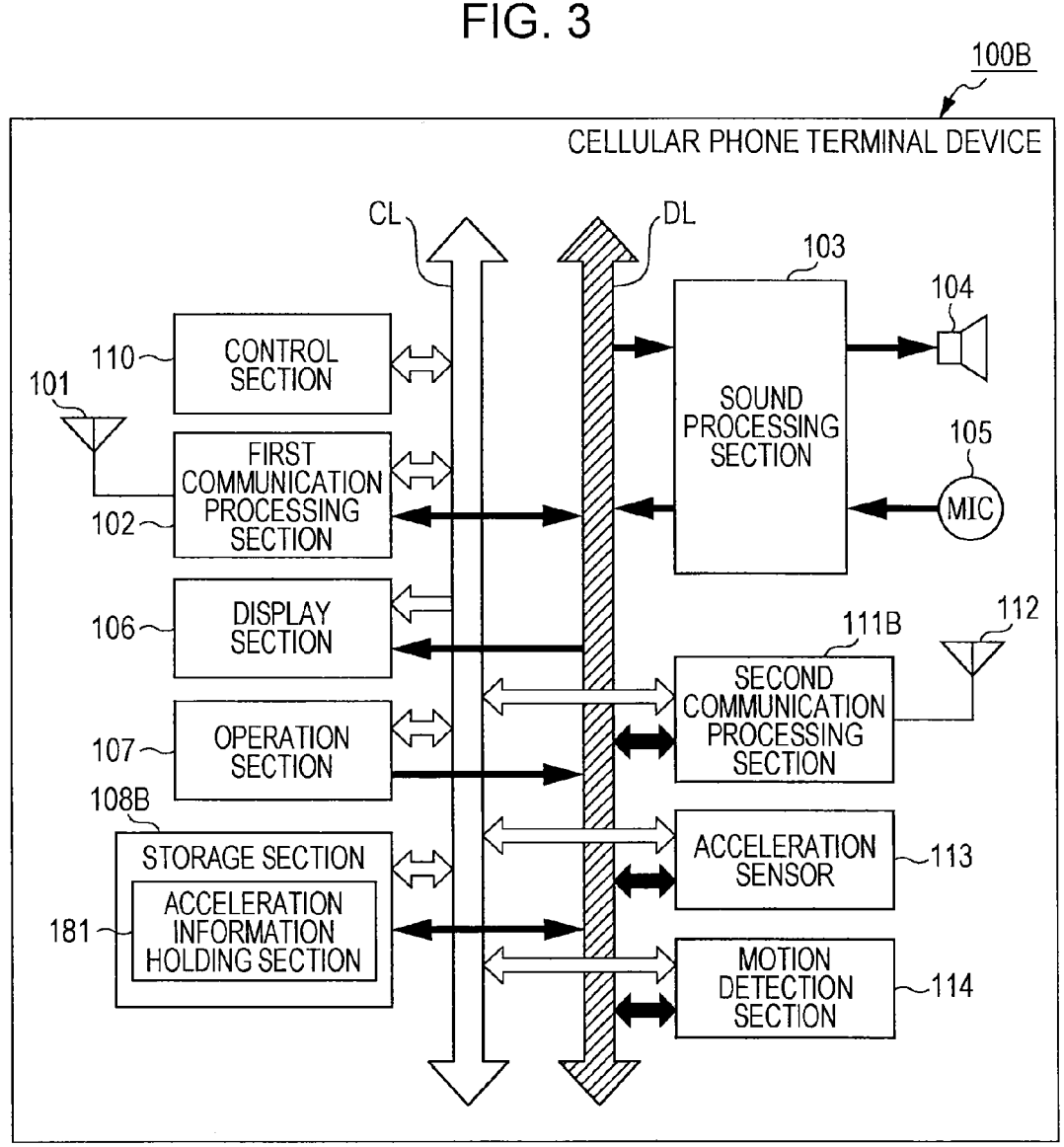
FIG. 3 is a block diagram showing an example of the configuration of a cellular phone terminal device according to the first embodiment of the present disclosure.

The configuration of the cellular phone terminal device 100B is different from the configuration of the cellular phone terminal device 100A shown in FIG. 2 in the configuration of a storage section 108B and in not including the motion determination section 115 (see FIG. 2) included in the cellular phone terminal device 100A. The storage section 108B includes the acceleration information holding section 181. The acceleration information holding section 181 holds acceleration information acquired by the acceleration sensor 113 and converted into an approximate value or a binary value by the motion detection section 114.

The second communication processing section 111B starts transmission of a beacon on the basis of control by the control section 110 in the case where the motion detection section 114 determines that a predetermined gesture is input by the user. More particularly, the second communication processing section 111B sets up the beacon at the timing when the motion detection section 114 detects the end point of the gesture. Then, the second communication processing section 111B transmits the acceleration information held in the acceleration information holding section 181 and the terminal identification information on the terminal device 100B as superposed on the beacon.

The second communication processing section 111B also transmits a request for connection to the cellular phone terminal device 100A using the terminal identification information on the cellular phone terminal device 100A transmitted as superposed on the beacon.

1-3. Example of Information Processing Performed by Communication System

Figure 4:
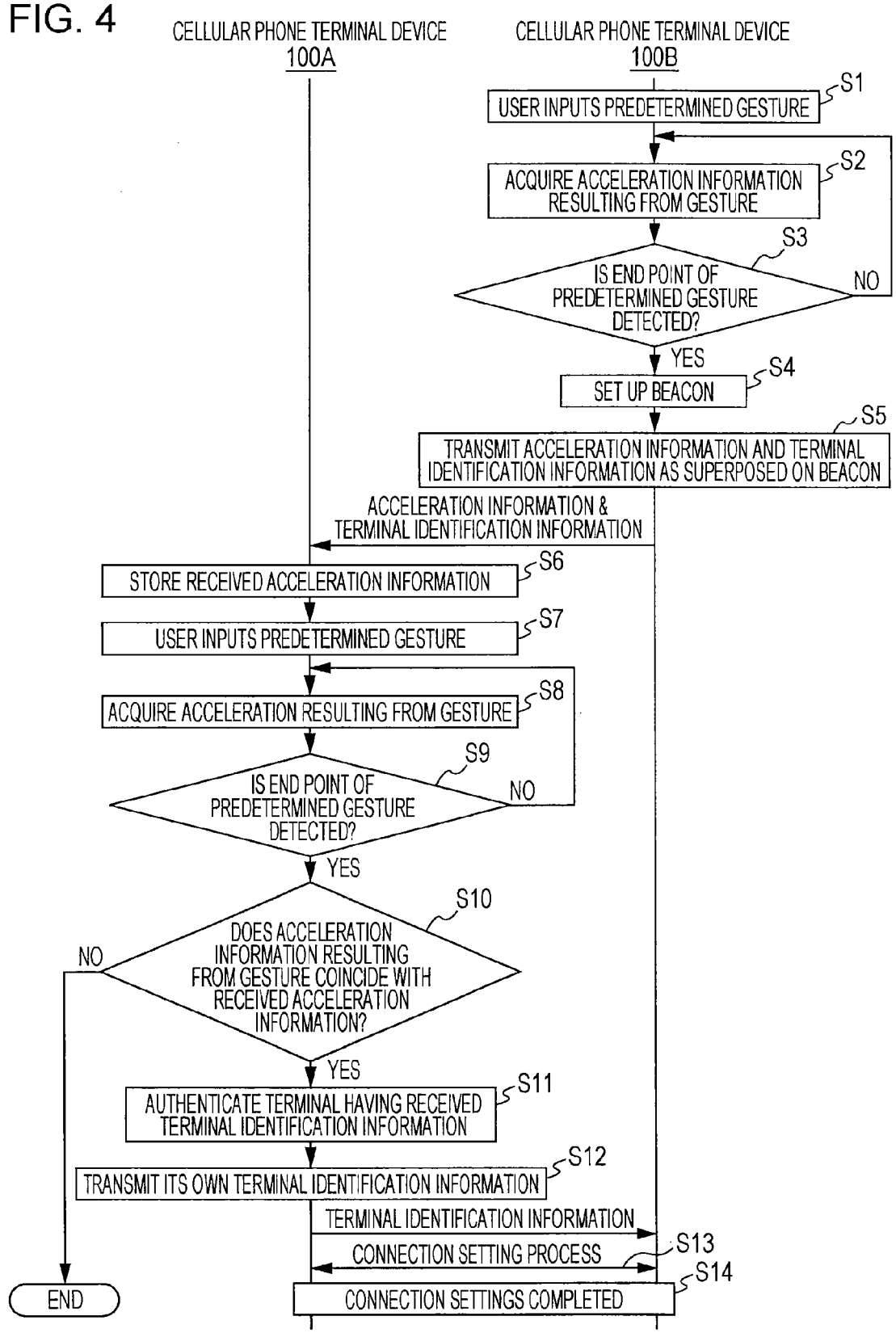
FIG. 4 is a flowchart showing an example of the process performed by the communication system according to the first embodiment of the present disclosure.

Next, an example of the flow of information processing performed by the communication system 1 formed by the cellular phone terminal device 100A and the cellular phone terminal device 100B discussed above will be described with reference to the flowchart of FIG. 4. First, when a predetermined gesture is input from the user to the cellular phone terminal device 100B (step S1), the motion detection section 114 acquires an acceleration value detected by the acceleration sensor 113 (see FIG. 3) as acceleration information (step S2). Subsequently, the control section 110 determines whether or not the end point of the gesture is detected by the motion detection section 114 (step S3). The process in step S2 is continued while the end point is not detected.

In the case where the end point of the gesture is detected, the second communication processing section 111B sets up a beacon (step S4), and transmits the acceleration information acquired in step S2 and terminal identification information on the terminal device 100B as superposed on the beacon (step S5).

In the cellular phone terminal device 100A, the acceleration information and the terminal identification information transmitted from the cellular phone terminal device 100B as superposed on the beacon are stored in the acceleration information storage section 182 and the terminal identification information storage section 183 (see FIG. 2), respectively (step S6). Subsequently, when the motion detection section 114 detects that a predetermined gesture is input by the user (step S7), the motion determination section 115 acquires an acceleration value detected by the acceleration sensor 113 as acceleration information (step S8).

Then, the motion determination section 115 determines whether or not the end point of the predetermined gesture is detected (step S9). The process in step S8 is continued until the end point is detected. In the case where the end point of the predetermined gesture is detected, the control section 110 subsequently determines whether the acceleration information obtained by analyzing the gesture and the acceleration information transmitted from the cellular phone terminal device 100B coincide with each other (step S10).

In the case where the two pieces of acceleration information do not coincide with each other, the process is terminated. In the case where the two pieces of acceleration information coincide with each other, the second communication processing section 111A authenticates the terminal having the terminal identification information stored in the terminal identification information storage section 183 in step S6 (cellular phone terminal device 100B) (step S11). At the same time, the second communication processing section 111A transmits terminal identification information on the terminal device 100A to the authenticated terminal (step S12). Consequently, a connection setting process is started (step S13), and a predetermined sequence determined in accordance with a wireless communication standard is executed to complete the connection setting process (step S14).

According to the embodiment discussed above, the sequence for initial settings required to start communication is started by the user of the cellular phone terminal device 100A and the user of the cellular phone terminal device 100B just by inputting the same gesture to the terminals to complete initial settings. This eliminates the need to provide the terminals with a dedicated button for starting connection settings or the like.

According to the embodiment discussed above, in addition, in the case where the gesture input to a terminal and the gesture input to its mating terminal coincide with each other, the mating terminal is authenticated. Thus, the user can save the trouble of checking an SSID of the mating terminal to input the SSID, or selecting an SSID from a list, and inputting information such as PIN code for use for authentication according to a standard such as WPS.

In the embodiment discussed above, connection settings are made in the case where terminals that desire to communicate with each other input the same gesture to each other. However, the present disclosure is not limited thereto. For example, the terminal to which a gesture for starting to make connection settings may transmit to the mating terminal additional information indicating the content of a gesture along with the acceleration information and the terminal identification information. Then, the mating terminal may be authenticated in the case where the same gesture as the gesture indicated by the additional information is input.

2. Modification of First Embodiment

Figure 5A:
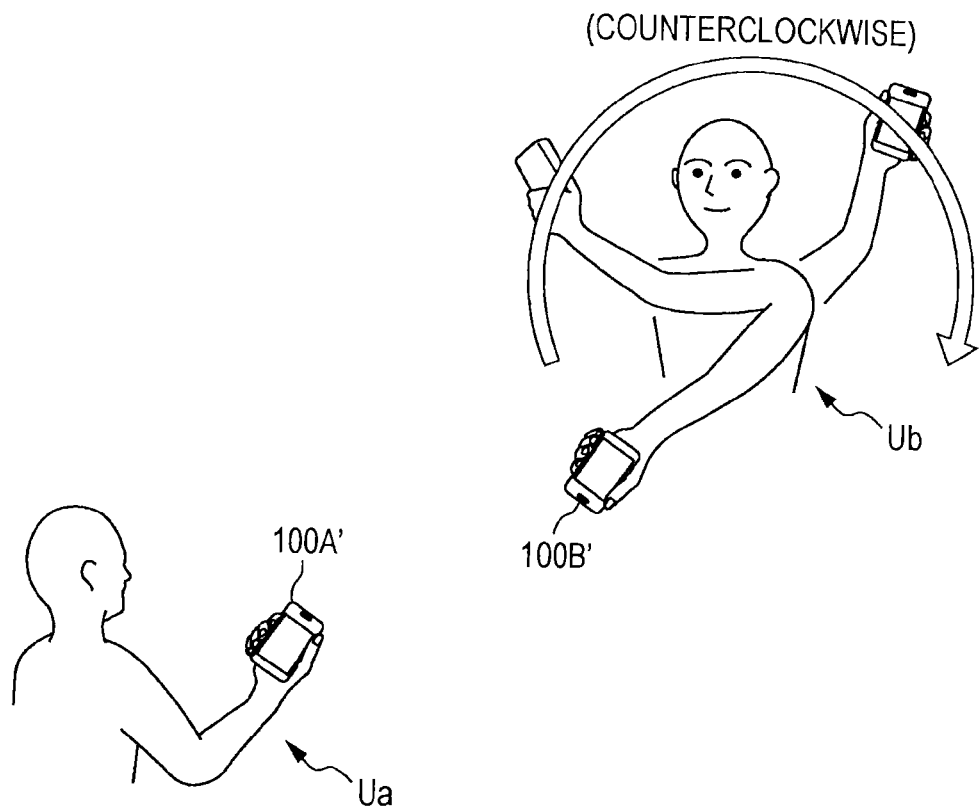
FIGS. 5A-5B are diagrams showing an example of the process performed by a communication system according to a modification of the first embodiment of the present disclosure.

2-1. Overview of Configuration of and Process Performed by Communication System FIG. 5 shows the outline of information processing performed by a communication system 1' configured in this way. FIG. 5A shows a user Ua and a user Ub that desire to transmit and receive data to and from each other, showing a state in which the user Ub makes a gesture for starting to make connection settings by rotating a cellular phone terminal device 100B' counterclockwise.

Figure 5B:
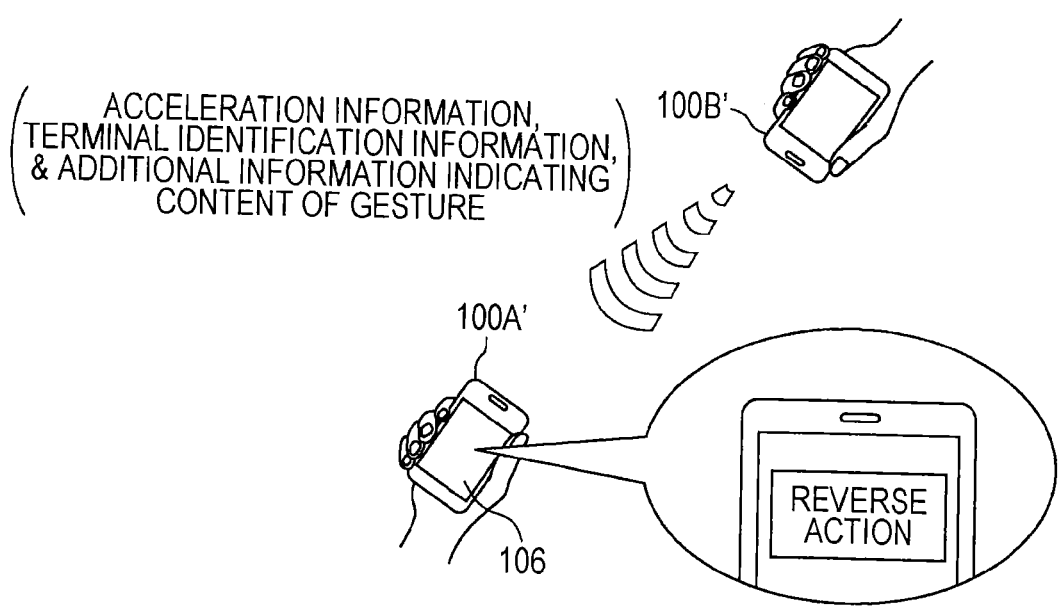

When such a gesture is input, additional information indicating the content of a gesture is transmitted, in addition to acceleration information and terminal identification information, from the cellular phone terminal device 100B' held by the user Ub to a cellular phone terminal device 100A' held by the user Ua as shown in FIG. 5B. In the example of FIG. 5B, information on a text "REVERSE ACTION" is transmitted as the additional information to be displayed on the display section 106 of the cellular phone terminal device 100A'

Figure 6A:
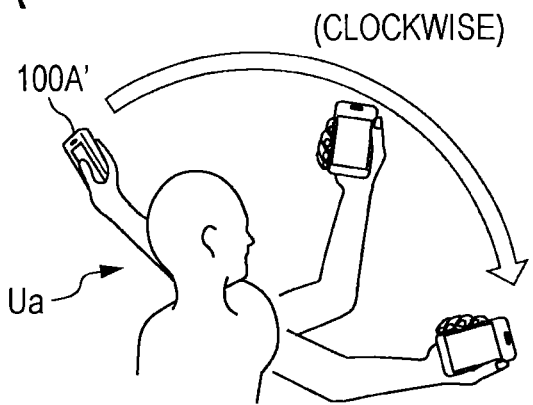
FIGS. 6A-6C are diagrams showing an example of the process performed by the communication system according to the modification of the first embodiment of the present disclosure.
Figure 6B:
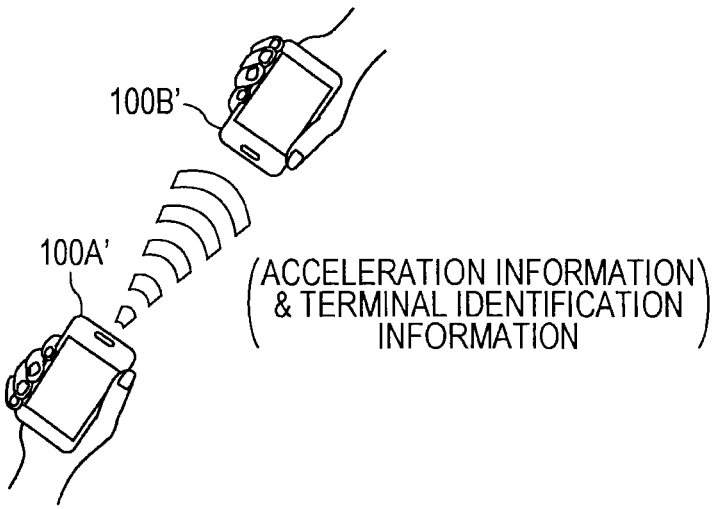
Figure 6C:
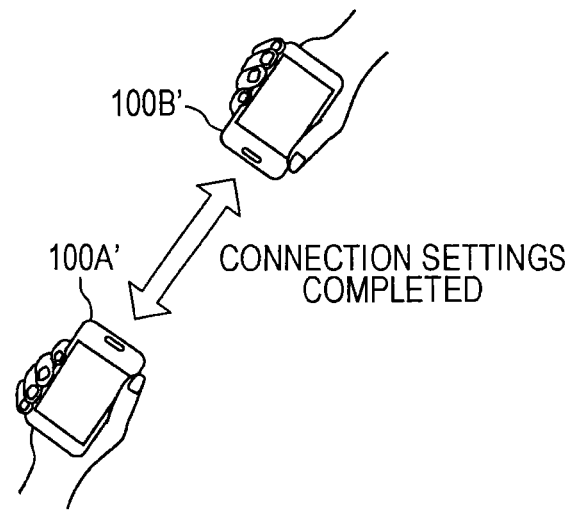

As shown in FIG. 6A, the user Ua holding the cellular phone terminal device 100A' with the additional information displayed on the display section 106 makes a gesture exactly as indicated on the display section 106. "REVERSE ACTION" is a message for a command to input a gesture corresponding to "REVERSE ACTION" of the gesture input by the user Ub of the cellular phone terminal device 100B' serving as the mating terminal. Therefore, the user Ua of the cellular phone terminal device 100A' inputs a gesture corresponding to "REVERSE ACTION" of the counterclockwise gesture (see FIG. 5A) input by the user Ub. That is, the user Ua inputs a gesture of rotating the cellular phone terminal device 100A' clockwise. This allows the cellular phone terminal device 100A' and the cellular phone terminal device 100B' to authenticate each other to complete connection settings required for wireless communication as shown in FIG. 6C.

2-2. Example of Configuration of Cellular Phone Terminal Devices

Subsequently, an example of the configuration of the cellular phone terminal device 100B' which receives the additional information will be described with reference to FIG. 7. Components in FIG. 7 corresponding to those in FIG. 3 are denoted by the same reference symbols to omit overlapping description. The configuration of the cellular phone terminal device 100B' is different from the configuration of the cellular phone terminal device 100B shown in FIG. 3 in the configuration of a storage section 108B' and in that the cellular phone terminal device 100B' includes the motion determination section 115 and an acceleration pattern generation section 116. The storage section 108B' includes the acceleration information holding section 181, the acceleration information storage section 182, and the terminal identification information storage section 183.

The acceleration pattern generation section 116 generates an acceleration pattern serving as a reference value corresponding to a gesture to be input by the user on the basis of the acceleration information and the additional information transmitted from the mating terminal.

Figure 7:
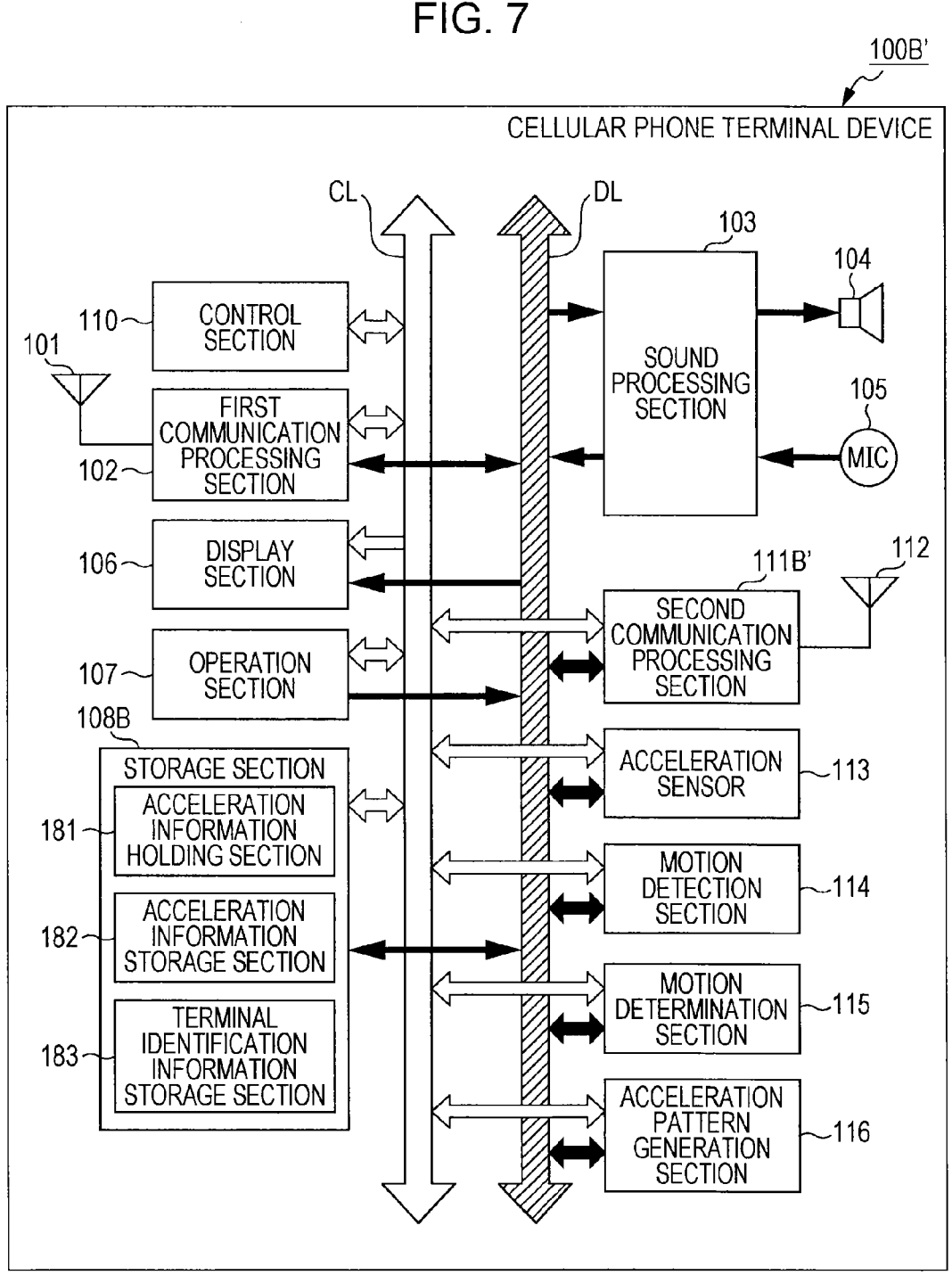
FIG. 7 is a block diagram showing an example of the configuration of a cellular phone terminal device according to the modification of the first embodiment of the present disclosure.

The motion determination section 115 shown in FIG. 7 determines whether the acceleration information received and stored in the acceleration information storage section 182 coincides with the acceleration pattern generated by the acceleration pattern generation section 116 to output the determination results to the control section 110. A second communication processing section 111B' approves the mating terminal in the case where the motion determination section 115 determines that the acceleration information resulting from the gesture input to the terminal device 100B' coincides with the acceleration pattern. Then, the second communication processing section 111B' transmits terminal identification information on the terminal device 100B' to the mating terminal.

2-3. Example of Information Processing Performed by Communication System

Figure 8:
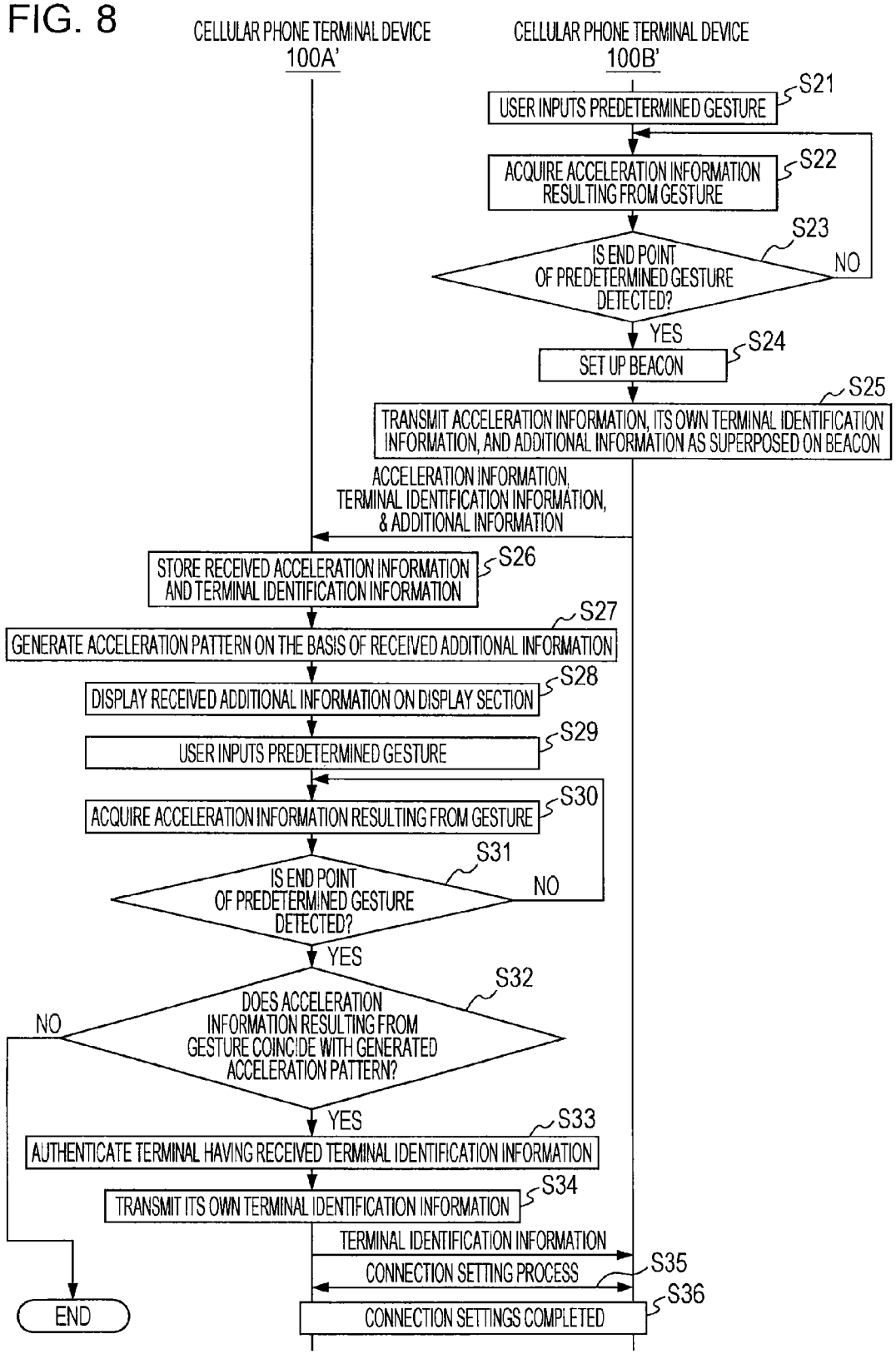
FIG. 8 is a flowchart showing an example of the process performed by the communication system according to the modification of the first embodiment of the present disclosure.

FIG. 8 is a flowchart showing an example of the process performed between the cellular phone terminal device 100A' and the cellular phone terminal device 100B'. First, when a predetermined gesture is input from the user Ub to the cellular phone terminal device 100B' (step S21), the motion detection section 115 acquires an acceleration value detected by the acceleration sensor 113 (see FIG. 7) as acceleration information (step S22). Subsequently, the motion determination section 115 determines whether or not the end point of the gesture is detected (step S23). The process in step S22 is continued while the end point is not detected.

In the case where the end point of the gesture is detected, the second communication processing section 111B' sets up a beacon (step S24), and transmits the acceleration information acquired in step S22, terminal identification information on the terminal device 100B', and additional information as superposed on the beacon (step S25). A random value generated by the control section 110 of the cellular phone terminal device 100B' is used as the additional information.

In the cellular phone terminal device 100A', the acceleration information and the terminal identification information transmitted from the cellular phone terminal device 100B' as superposed on the beacon are stored in the acceleration information storage section 182 and the terminal identification information storage section 183, respectively (step S26). Subsequently, the acceleration pattern generation section 116 generates an acceleration pattern on the basis of the received additional information (step S27). At the same time, the additional information received from the cellular phone terminal device 100B' is displayed on the display section 106 under control by the control section 110 (step S28).

Subsequently, when it is detected that a predetermined gesture is input by the user (step S29), the motion determination section 115 acquires an acceleration value detected by the acceleration sensor 113 as acceleration information (step S30). Subsequently, the motion determination section 115 determines whether or not the end point of the predetermined gesture is detected (step S31). The process in step S30 is continued until the end point is detected. In the case where the end point of the gesture is detected, the motion determination section 115 determines whether the acceleration information obtained by analyzing the gesture and the acceleration pattern generated in step S27 coincide with each other (step S32).

In the case where the acceleration information does not coincide with the acceleration pattern, the process is terminated. In the case where the acceleration information coincides with the acceleration pattern, the second communication processing section 111A authenticates the terminal having the terminal identification information stored in the terminal identification information storage section 183 in step S26, that is, the cellular phone terminal device 100B' (step S33). At the same time, the second communication processing section 111A transmits terminal identification information on the terminal device 100A' to the terminal authenticated in step S33 (step S34). A connection setting process is started on the basis of this process (step S35), and a predetermined sequence determined in accordance with a wireless communication standard is executed to complete the connection setting process (step S36).

According to the embodiment discussed above, the probability that a connection setting process is performed with a terminal other than the desired terminal can be reduced compared to the technique described in relation to the first embodiment. In the first embodiment, for example, in the case where a gesture for starting to make connection settings is input by a person that is different from the mate with which it is desired to start communication, connection setting may be started with the different person. That is, in the case where a gesture of swinging an arm downward from above the head is made as the gesture for starting to make connection settings and where a different user staying nearby happens to make the same gesture, connection setting may be made with the different user.

According to the method described in relation to the modification of the first embodiment, in contrast, connection setting is made with the terminal to which the gesture indicated by the additional information is input. Thus, even in the case where a different user that saw the gesture for starting to make connection settings makes the same gesture, or in the case where a different user happens to make the same gesture, connection setting is not started with such users. That is, even if a different user staying at a location that a radio wave does not reach (where the additional information cannot be received) sees the gesture for starting to make connection settings and makes a similar motion, connection setting is not started with the different user. Thus, connection setting can be made more reliably with the desired mate.

In the example shown in FIGS. 5A to 8, the acceleration pattern based on the additional information is generated by the cellular phone terminal device 100A' which receives the additional information. However, the acceleration pattern may be generated by the cellular phone terminal device 100B' which generates the additional information.

3. Second Embodiment 3-1. Overview of Configuration of and Process Performed by Communication System Next, an overview of the configuration of and the process performed by a communication system 1 according to a second embodiment of the present disclosure will be described with reference to FIGS. 9A-9C. In the second embodiment, the content of a gesture for starting to make settings for wireless connection is determined in advance, and connection setting is started in the case where a gesture exactly as determined is input to one of two terminals, between which it is desired to start communication.

Figure 9A:
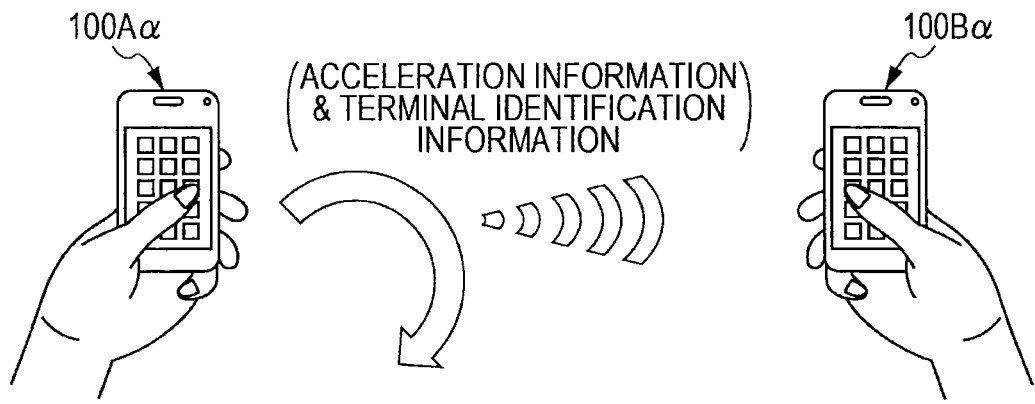
FIGS. 9A-9C are diagrams showing an example of the configuration of and the process performed by a communication system according to a second embodiment of the present disclosure.

First, in the case where the user inputs a gesture of swinging a cellular phone terminal device 100A$\alpha$ downward from above as shown in FIG. 9A, the cellular phone terminal device 100A$\alpha$ is triggered upon detection of the gesture to start transmitting a beacon. Acceleration information indicating the content of the gesture made by the user and terminal identification information on the cellular phone terminal device 100A$\alpha$ are superimposed on the beacon.

Figure 9B:
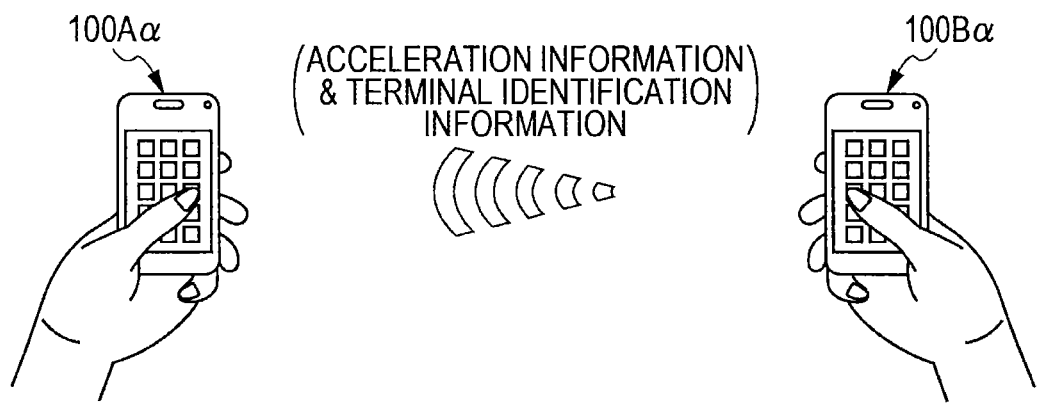
Figure 9C:
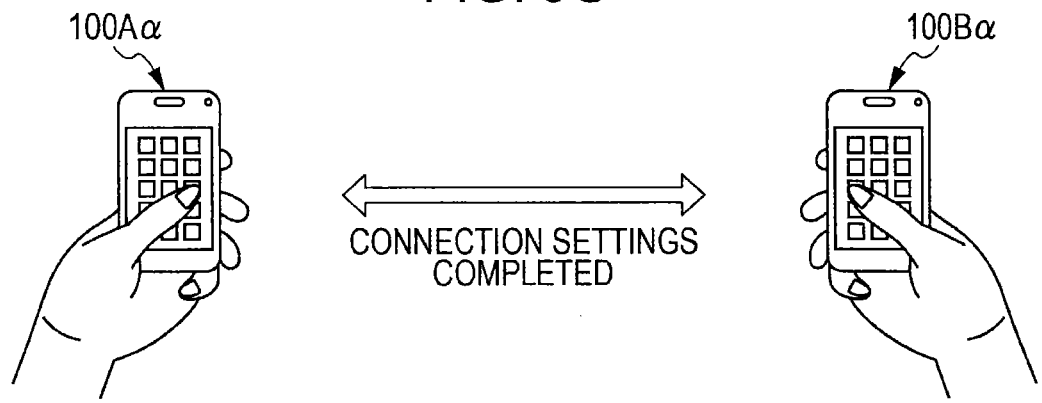

A cellular phone terminal device 100B$\alpha$ acquires the acceleration information and the terminal identification information sent as superimposed on the beacon, and stores the information in the terminal device 100B$\alpha$. Then, in the case where the received acceleration information coincides with an acceleration pattern determined in advance, a set of the acceleration information received from the cellular phone terminal device 100A$\alpha$ and terminal identification information on the terminal device 100B$\alpha$ is transmitted as superposed on a beacon as shown in FIG. 9B.

Subsequently, the cellular phone terminal device 100A$\alpha$ determines whether the acceleration information transmitted from the cellular phone terminal device 100B$\alpha$ coincides with acceleration information which the terminal device 100A$\alpha$ already transmitted through broadcasting. That is, it is checked whether or not the terminal having the terminal identification information transmitted to the terminal device 100A$\alpha$ matches the mating terminal to which the terminal device 100A$\alpha$ sent the acceleration information.

Then, in the case where the acceleration information sent to the terminal device 100A$\alpha$ is the same as the acceleration information which the terminal device 100A$\alpha$ already transmitted, the cellular phone terminal device 100A$\alpha$ authenticates the cellular phone terminal device 100B$\alpha$ to provide a notification of authentication to the cellular phone terminal device 100B$\alpha$. A connection setting process is performed between the cellular phone terminal devices 100A$\alpha$ and 100B$\alpha$ on the basis of this process to establish a data link between the cellular phone terminal devices 100A$\alpha$ and 100Bα, thereby enabling transmission of data frames (connection settings completed; see FIG. 9C).

3-2. Example of Configuration of Cellular Phone Terminal Devices

Figure 11:
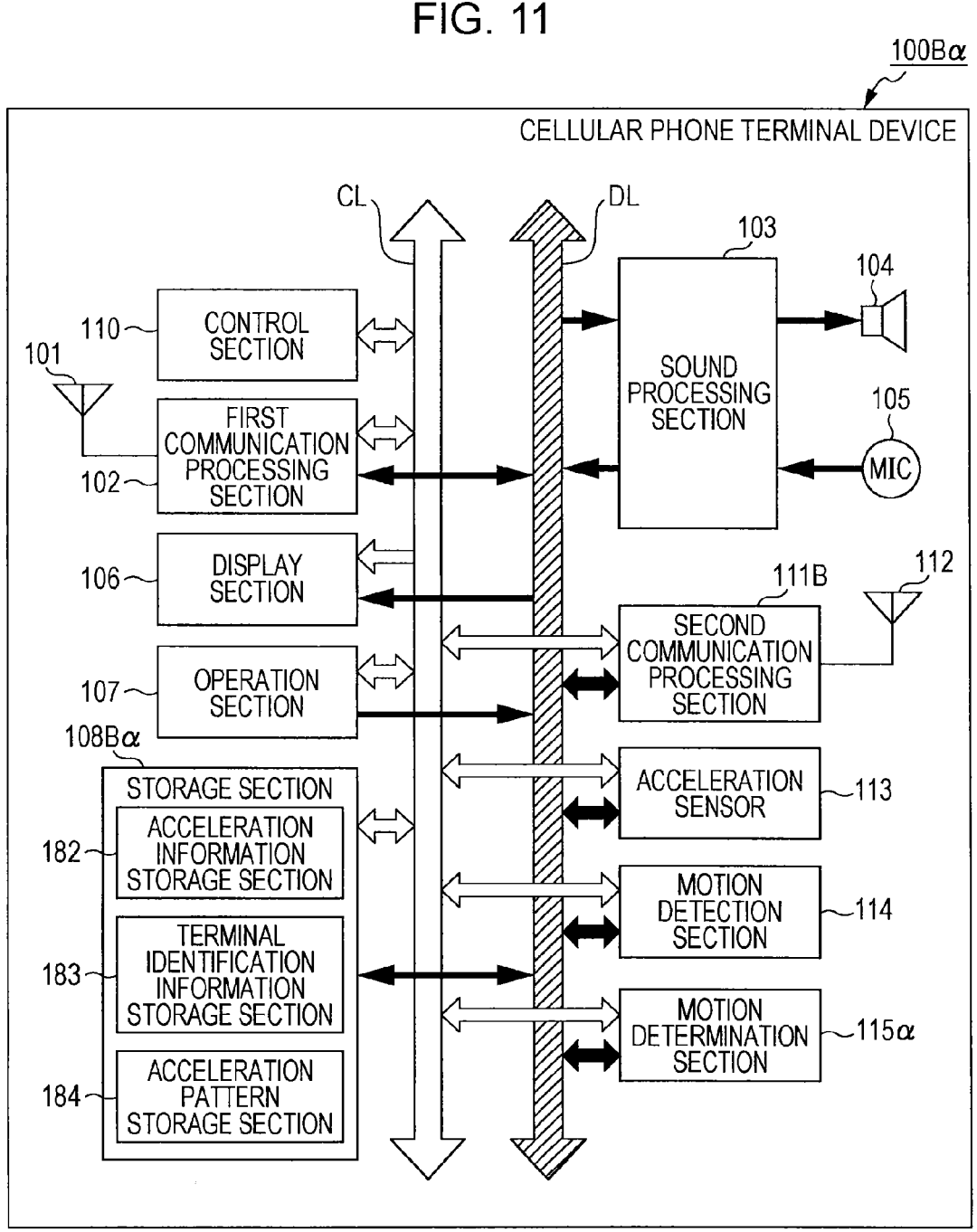
FIG. 11 is a block diagram showing an example of the configuration of a cellular phone terminal device according to the second embodiment of the present disclosure.

Next, an example of the configuration of the cellular phone terminal device 100Aα and the cellular phone terminal device 100Bα will be described with reference to FIGS. 10 and 11. In the embodiment, the cellular phone terminal device 100Aα serves as the terminal to which a gesture for starting to make connection settings is first input. The cellular phone terminal device 100Bα serves as the terminal which determines whether or not the gesture input to the cellular phone terminal device 100Aα coincides with a gesture determined in advance.

First, an example of the configuration of the cellular phone terminal device 100Aα will be described with reference to FIG. 10. Components in FIG. 10 corresponding to those in FIG. 2 are denoted by the same reference symbols to omit overlapping description.

In the embodiment, it is not determined whether the respective contents of gestures input to the terminals coincide with each other, but it is determined whether a gesture input to one of the terminals is the same as a gesture determined in advance, and the determination is made by the cellular phone terminal device 100Bα. Therefore, in the cellular phone terminal device 100Aα, in the case where a particular gesture is input by the user, the motion detection section 114 detects the input gesture, and the second communication processing section 111A transmits acceleration information produced as a result of the gesture to the cellular phone terminal device 100Bα.

In the cellular phone terminal device 100Aα, in addition, in the case where acceleration information and terminal identification information are transmitted from the cellular phone terminal device 100Bα, the control section 110 determines whether the sent acceleration information coincides with the acceleration information which the terminal device 100Aα already transmitted. In the case where a coincidence is made, the second communication processing section 111A is controlled so as to authenticate the cellular phone terminal device 100Bα.

Subsequently, an example of the configuration of the cellular phone terminal device 100Bα will be described with reference to FIG. 11. Components in FIG. 11 corresponding to those in FIGS. 3 and 7 are denoted by the same reference symbols to omit overlapping description. The configuration of the cellular phone terminal device 100Bα is different from the configuration of the cellular phone terminal device 100B shown in FIG. 3 in the configuration of a storage section 108Bα and in the content of the process performed by a motion determination section 115α.

The storage section 108Bα includes the acceleration information storage section 182 which stores terminal identification information transmitted from the mating terminal and an acceleration pattern storage section 184. The acceleration pattern storage section 184 stores an acceleration pattern corresponding to the content of a predetermined gesture for starting to make connection settings. For example, in the case where a motion of rotating the terminal clockwise twice is set as the gesture for starting to make connection settings, an acceleration value resulting from rotating the terminal clockwise twice is stored in advance as a reference value. In the following description, the reference value is also referred to as "acceleration pattern".

The motion determination section 115α determines whether the acceleration information transmitted from the cellular phone terminal device 100Aα serving as the mating terminal coincides with the acceleration pattern stored in the acceleration pattern storage section 184 to output the determination results to the control section 110. In the case where it is determined that the acceleration information transmitted from the cellular phone terminal device 100Aα coincides with the acceleration pattern determined in advance, the second communication processing section 111B authenticates the cellular phone terminal device 100Aα on the basis of control by the control section 110. Then, the second communication processing section 111B provides a notification of authentication to the cellular phone terminal device 100Aα.

The acceleration pattern storage section 184 may store a plurality of types of acceleration patterns. By correlating pieces of information on different terminals or devices with the plurality of acceleration patterns, the terminal or device for connection can be changed in accordance with the type of an input gesture.

3-3. Example of Information Processing Performed by Communication System

Figure 12:
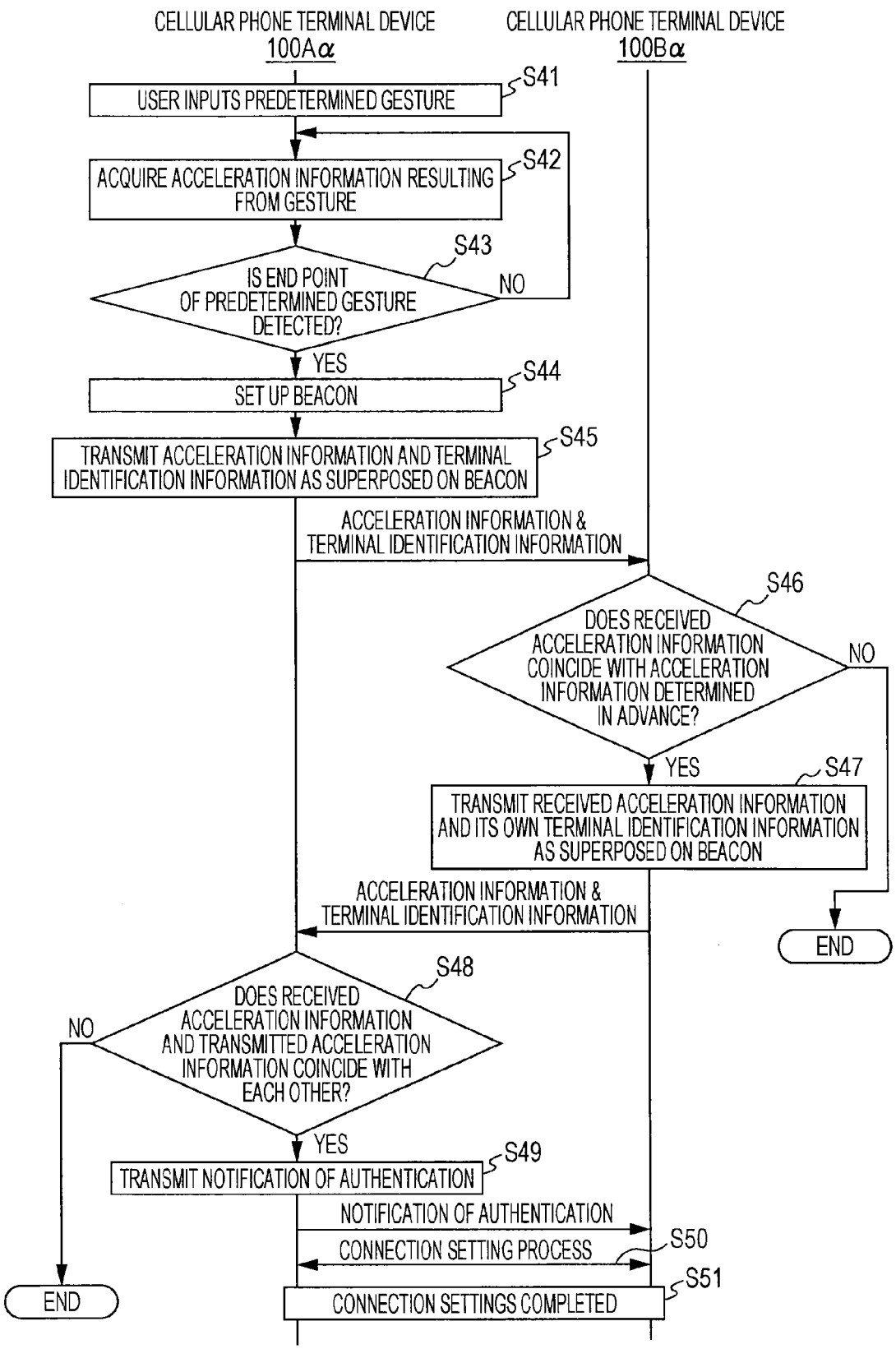
FIG. 12 is a flowchart showing an example of the process performed by the communication system according to the second embodiment of the present disclosure.

Next, an example of information processing performed by the communication system 1α according to the embodiment will be described with reference to FIG. 12. FIG. 12 is a flowchart showing an example of the process performed between the cellular phone terminal device 100Aα and the cellular phone terminal device 100Bα. First, when a predetermined gesture is input to the cellular phone terminal device 100Aα (step S41), an acceleration value resulting from the gesture is acquired by the acceleration sensor 113 (see FIG. 10), and converted into acceleration information by the motion detection section 114 (step S42). Subsequently, the motion detection section 114 determines whether or not the end point of the gesture is detected (step S43). The process in step S42 is continued until the end point is detected.

In the case where the end point of the gesture is detected, the second communication processing section 111A sets up a beacon (step S44). Then, the acceleration information acquired in step S42 and terminal identification information on the terminal device 100Aα are transmitted as superposed on the beacon (step S45).

In the cellular phone terminal device 100Bα, it is determined whether or not the acceleration information transmitted from the cellular phone terminal device 100Aα as superposed on the beacon coincides with the acceleration pattern stored in advance in the acceleration pattern storage section 184 (see FIG. 11) (step S46). In the case where the received acceleration information does not coincide with the acceleration pattern stored in the acceleration pattern storage section 184, the process is terminated. In the case where the received acceleration information coincides with the acceleration pattern determined in advance, the received acceleration information and identification information on the terminal device 100Bα are transmitted as superposed on a beacon (step S47).

In the cellular phone terminal device 100Aα, it is determined whether the acceleration information sent from the cellular phone terminal device 100Bα and the acceleration information acquired in step S2 coincide with each other (step S48). Subsequently, it is checked whether the received acceleration information and the acceleration information which the terminal device 100Aα acquired and already transmitted as superposed on the beacon coincide with each other (step S48). In the case where a coincidence is not made, the process is terminated. In the case where a coincidence is made, a notification of authentication is provided to the mating terminal (step S49). This triggers a connection setting process to start (step S50), and a predetermined connection sequence is performed to complete connection settings (step S51).

According to the second embodiment discussed above, connection setting required for wireless communication can be started just by inputting a gesture exactly as determined in advance to one of two terminals, between which it is desired to start wireless communication, and can be automatically completed.

Therefore, even in the case where the device with which it is desired to perform wireless communication is an immovable device such as a television receiver, for example, connection settings for wireless communication can be made without taking the trouble of setting the SSID, inputting the PIN code, or the like.

4. Third Embodiment

4-1. Overview of Configuration of and Process Performed by Communication System Next, an overview of the configuration of and the process performed by a communication system 1β according to a third embodiment of the present disclosure will be described with reference to FIGS. 13A-14B. In the third embodiment, connection setting is started in the case where a predetermined gesture is input to one of two terminals and the gesture is made in the direction of the other terminal.

Figure 13A:
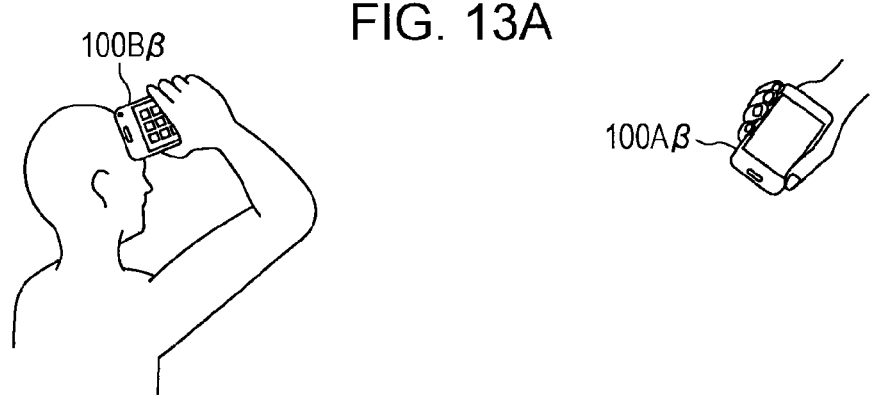
FIGS. 13A-13C are diagrams showing an example of the configuration of and the process performed by a communication system according to a third embodiment of the present disclosure.
Figure 13B:
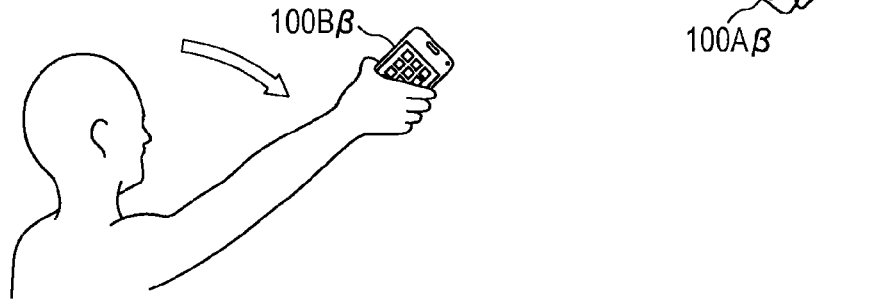
Figure 13C:
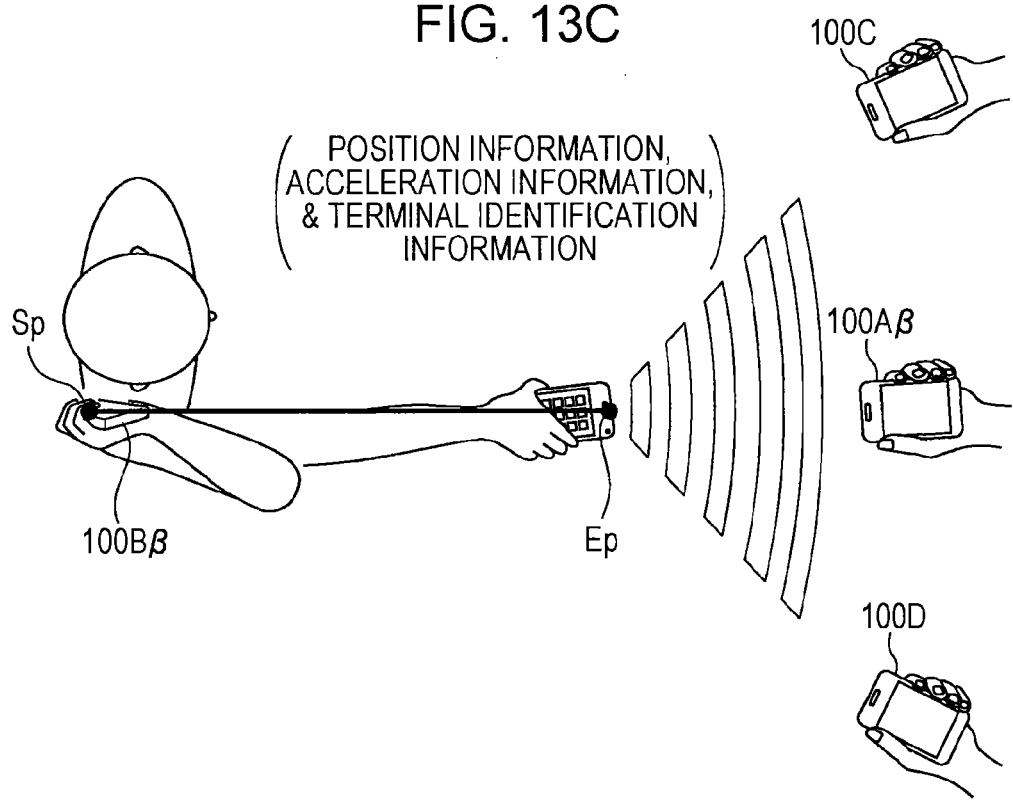

First, it is assumed that the user Ub of a cellular phone terminal device 100Bβ swings the cellular phone terminal device 100Bβ upward to above his/her head as shown in FIG. 13A and then swings the cellular phone terminal device 100Bβ downward as shown in FIG. 13B. The user Ub desires to start communication with a cellular phone terminal device 100Aβ, and makes a motion of swinging his/her arm downward in the direction of the cellular phone terminal device 100Aβ. When such a gesture is input, a beacon is transmitted from the cellular phone terminal device 100Bβ as shown in FIG. 13C. Acceleration information acquired by the cellular phone terminal device 100Bβ, position information acquired at a start point Sp and an end point Ep of the gesture, and terminal identification information on the cellular phone terminal device 100Bβ are superimposed on the beacon.

Figure 14A:
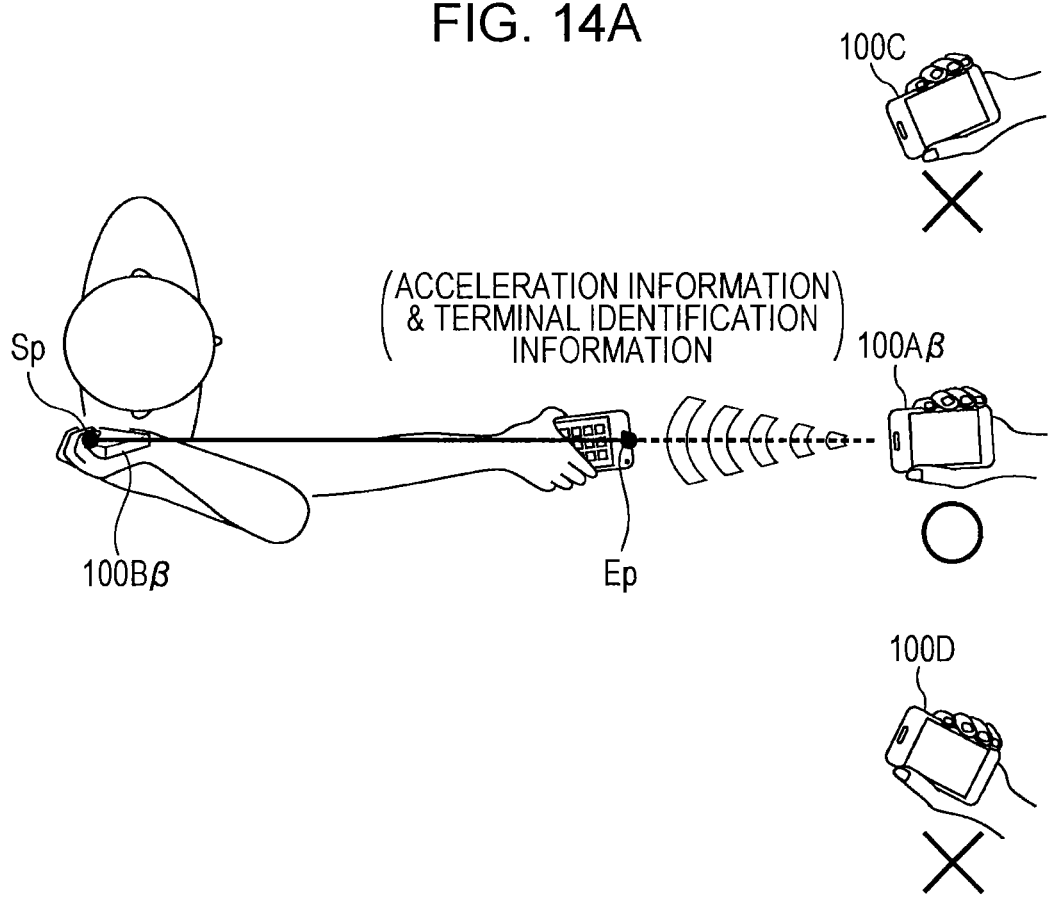
FIGS. 14A-14B are diagrams showing an example of the configuration of and the process performed by a communication system according to the third embodiment of the present disclosure.
Figure 14B:
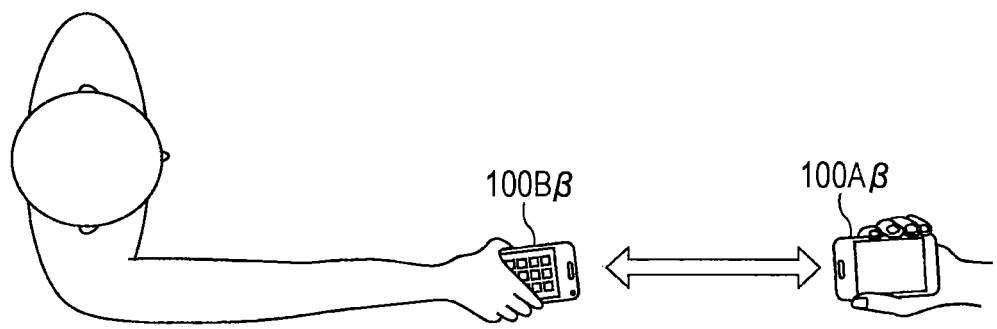

The beacon is non-directional. Therefore, in the case where there are other terminals (here, cellular phone terminal devices 100C and 100D) etc. around the terminal with which it is desired to start communication as shown in FIG. 14A, such terminals also receive the beacon. However, the cellular phone terminal device 100Aβ which receives the beacon determines whether the gesture input to the mating terminal is made in the direction of the terminal device 100Aβ.

Then, in the case where it is determined that the input gesture is made in the direction of the terminal device 100Aβ, the cellular phone terminal device 100Aβ transmits information required for connection as superposed on a beacon. Connection settings required for wireless communication are made between the cellular phone terminal device 100Aβ and the cellular phone terminal device 100Bβ to establish a data link, thereby enabling transmission of data frames (see FIG. 14B).

By performing such a process, only the terminal positioned in the direction indicated by the trajectory connecting the start point Sp and the end point Ep of the gesture input to the cellular phone terminal device 100Bβ remains as the terminal with which connections setting are to be made. That is, setting for wireless connection is started with the cellular phone terminal device 100Aβ.

4-2. Overview of Configuration of and Process Performed by Communication System Next, an example of the configuration of the cellular phone terminal device 100Aβ and the cellular phone terminal device 100Bβ will be described with reference to FIGS. 15 and 16. In the embodiment, the cellular phone terminal device 100Bβ serves as the terminal to which a gesture for starting to make connection settings is first input, and makes settings for wireless connection on the basis of information transmitted from the mating terminal. The cellular phone terminal device 100Aβ serves as the terminal which determines whether or not the gesture input to the cellular phone terminal device 100Bβ indicates the direction of the terminal device 100Aβ.

Figure 15:
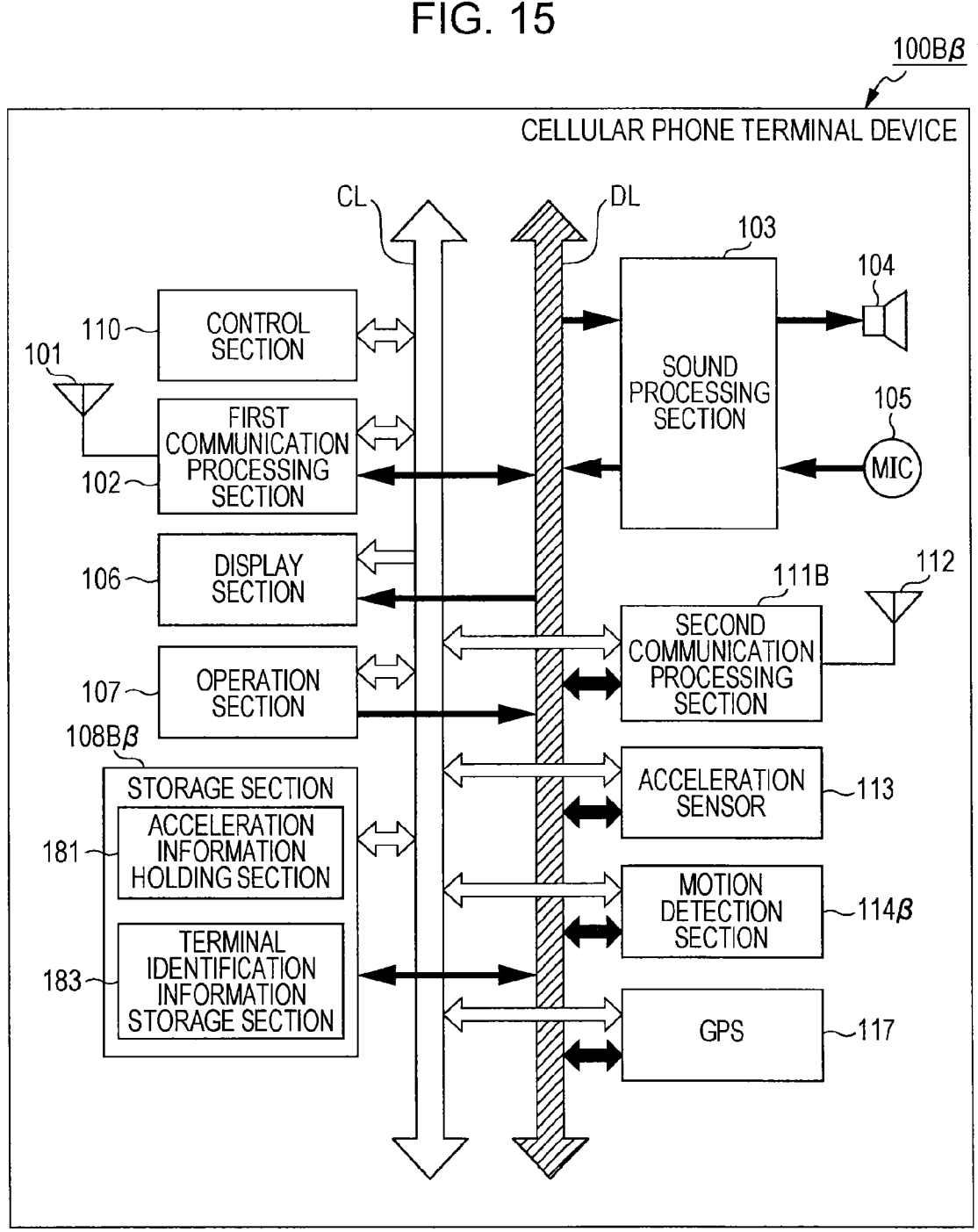
FIG. 15 is a block diagram showing an example of the configuration of a cellular phone terminal device according to the third embodiment of the present disclosure.

First, an example of the configuration of the cellular phone terminal device 100Bβ will be described with reference to FIG. 15. Components in FIG. 15 corresponding to those in FIGS. 3, 7, and 11 are denoted by the same reference symbols to omit overlapping description. The cellular phone terminal device 100Bβ includes a GPS (Global Positioning System) 117 serving as a position detection section that detects the position of the device itself, in addition to the second communication processing section 111B and the acceleration sensor 113. The GPS 117 calculates information on the longitude, the latitude, and the altitude of the GPS 117 serving as a receiver by receiving radio waves from a plurality of GPS satellites to determine the respective distances from the satellites.

The GPS 117 acquires position information on the basis of control by the control section 110 when the motion detection section 114 detects the start point of the gesture and when the motion detection section 114 detects the end point of the gesture. The second communication processing section 111B sets up a beacon at the time when the end point of the gesture is detected, and transmits acceleration information, position information at the start point and the end point of the gesture, and terminal identification information on the terminal device 100Bβ as superposed on the beacon.

In the case where a set of acceleration information and terminal identification information is received from a plurality of terminals, the second communication processing section 111B performs control so as to reduce the power for transmitting the beacon. This control is continued until more than one piece of acceleration information is not received any more.

Figure 16:
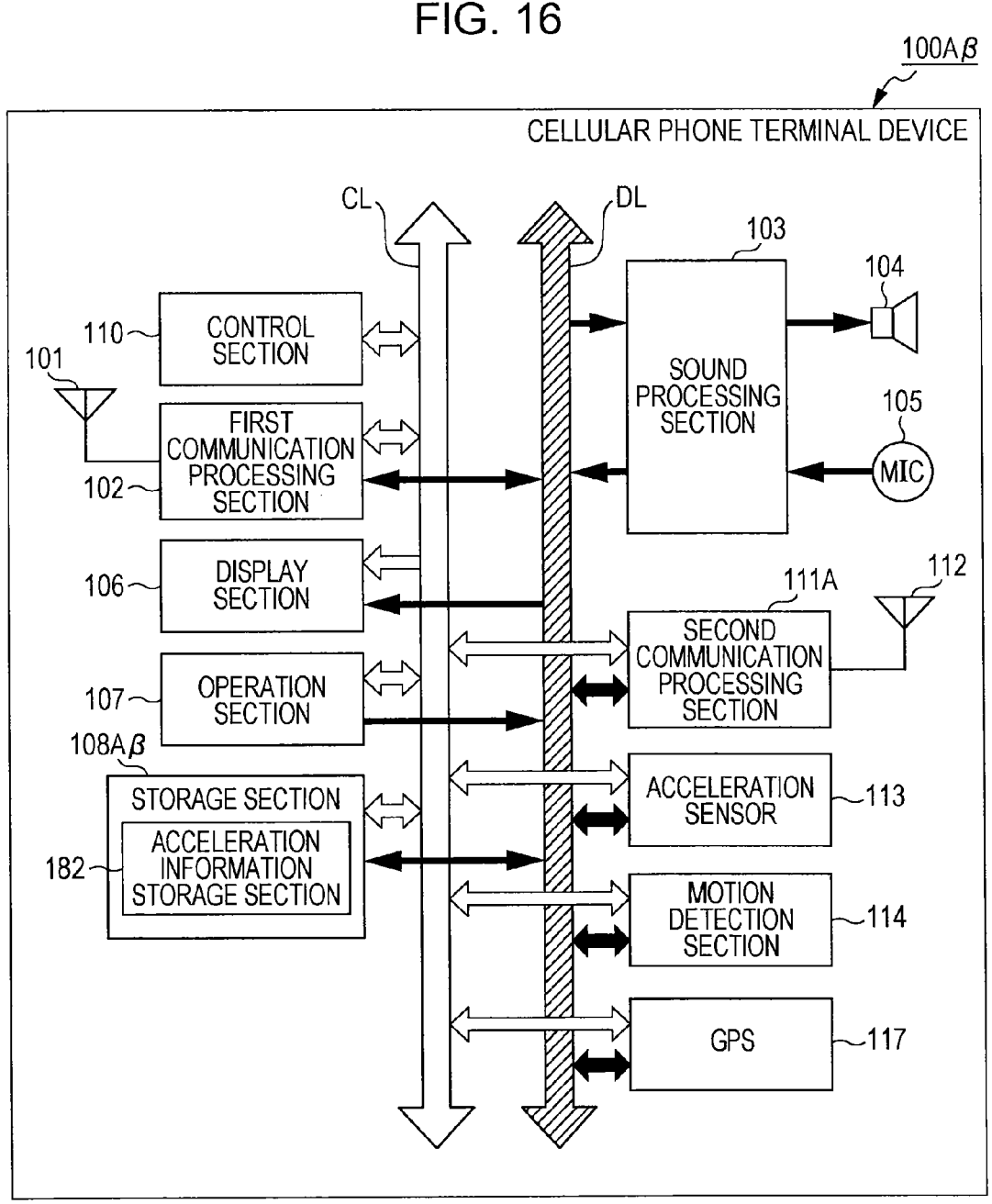
FIG. 16 is a block diagram showing an example of the configuration of a cellular phone terminal device according to the third embodiment of the present disclosure.

Next, an example of the configuration of the cellular phone terminal device 100Aβ will be described with reference to FIG. 16. Components in FIG. 16 corresponding to those in FIGS. 2 and 10 are denoted by the same reference symbols to omit overlapping description. As with the cellular phone terminal device 100Bβ, the cellular phone terminal device 100Aβ also includes a GPS 117 serving as a position information detection section. A motion detection section 114 determines whether or not a gesture input to the mating terminal is made in the direction of the terminal device 100Aβ on the basis of the acceleration information and the position information at the start point and the end point of the gesture transmitted from the mating terminal and position information indicating the position of the terminal device 100Aβ (position information detected by the GPS 117 (see FIG. 15)). In the case where the motion detection section 114 determines that the gesture is made in the direction of the terminal device 100Aβ, the second communication processing section 111A transmits the received acceleration information and terminal identification information on the terminal device 100Aβ as superposed on a beacon.

4-3. Example of Information Processing Performed by Communication System

Figure 17:
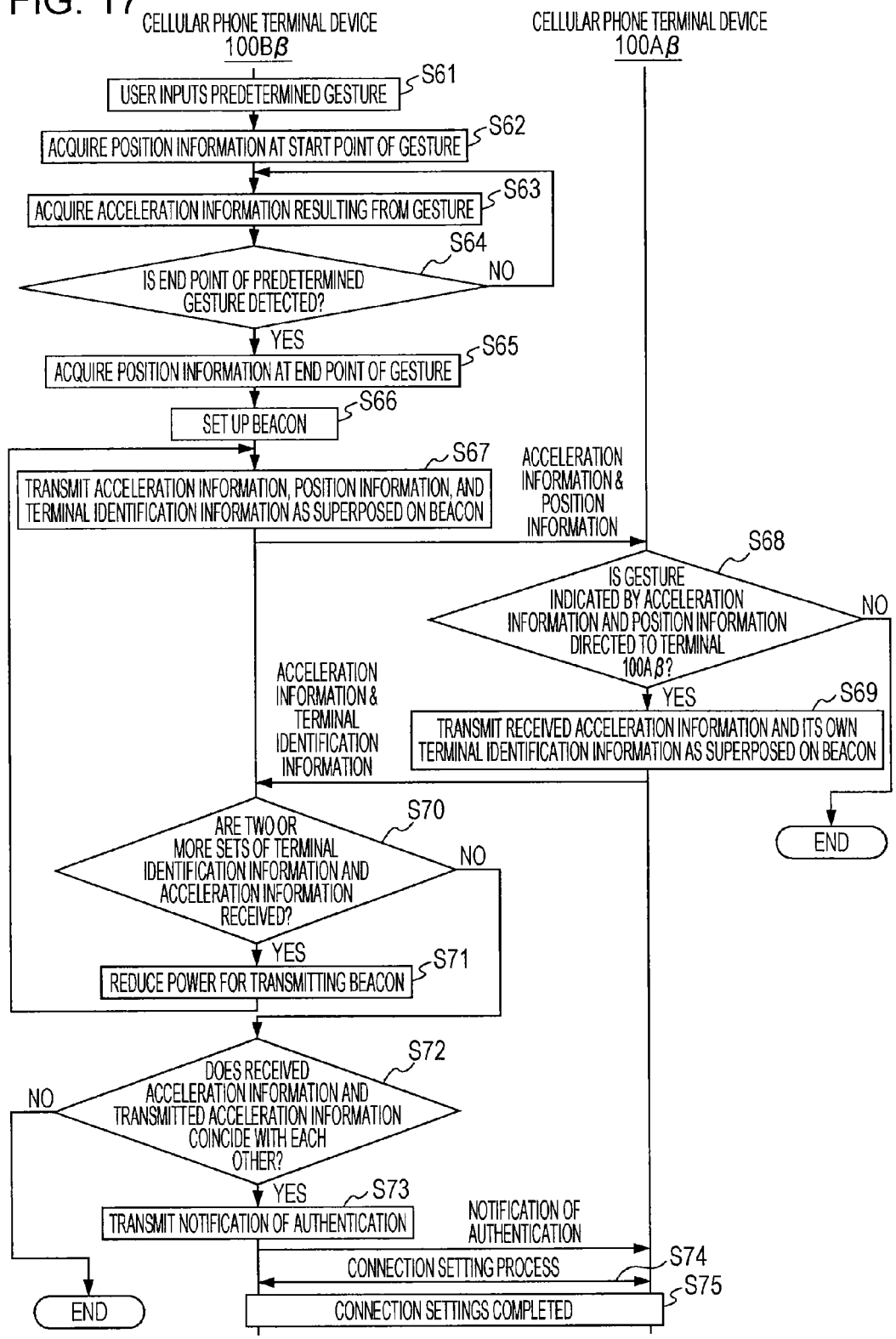
FIG. 17 is a flowchart showing an example of the process performed by the communication system according to the third embodiment of the present disclosure.

Next, an example of information processing performed by the communication system 1β according to the embodiment will be described with reference to FIG. 17. FIG. 17 is a flowchart showing an example of the process performed between the cellular phone terminal device 100Aβ and the cellular phone terminal device 100Bβ. First, when a predetermined gesture is input to the cellular phone terminal device 100Bβ (step S61), the GPS 117 (see FIG. 15) acquires position information at the start point of the gesture (step S62). At the same time, the motion detection section 114 acquires acceleration information resulting from the input gesture (step S63).

Subsequently, the motion detection section 114 determines whether or not the end point of the gesture is detected (step S64). In the case where the end point of the gesture is not detected, the procedure returns to step S63 to continue the process. In the case where the end point of the gesture is detected, the GPS 117 acquires position information at the end point of the gesture, and the second communication processing section 111B sets up a beacon (step S66). Then, the second communication processing section 111B transmits the acceleration information acquired in step S63, the position information acquires at the start point and the end point of the gesture, and terminal identification information on the terminal device 100Bβ as superposed on the beacon (step S67).

In the cellular phone terminal device 100Aβ, the motion detection section 114 (see FIG. 16) determines on the basis of the acceleration information and the position information transmitted as superposed on the beacon and position information on the device itself whether or not the gesture input to the cellular phone terminal device 100Bβ is made toward the terminal device 100Aβ (step S68). In the case where it is determined that the gesture is not made toward the terminal device 100Aβ, the process is terminated. In the case where it is determined that the gesture is made toward the terminal device 100Aβ, the received acceleration information and terminal identification information on the terminal device 100Aβ are transmitted as superposed on a beacon (step S69).

In the cellular phone terminal device 100Bβ, it is determined whether two or more sets of acceleration information and terminal identification information are received (step S70). In the case where two or more such sets are received, the second communication processing section 111B performs a process of reducing the power for transmitting the beacon (step S71). Then, the procedure returns to step S67 to continue the process. That is, the power for transmitting the beacon is gradually reduced while a set of acceleration information and terminal identification information is transmitted from a plurality of terminals.

For example, a case where the user inputs to the cellular phone terminal device 100Bβ a gesture of swinging the terminal downward from above his/her head is considered. In this case, in the case where there is a different terminal behind the user when he/she swings his/her arm upward, the terminal may also determine that the gesture is made toward the terminal. In this case, not only the cellular phone terminal device 100Aβ positioned at a location pointed by the cellular phone terminal device 100Bβ but also the different terminal positioned behind transmits acceleration information and terminal identification information. In such a case, the power for transmitting the beacon is reduced so that connection setting is not started with a terminal other than the cellular phone terminal device 100Aβ with which it is desired to start communication.

Gradually reducing the power for transmitting the beacon gradually reduces the range reached by the beacon. This is considered to gradually reduce the number of pieces of acceleration information sent in response to the transmission from the cellular phone terminal device 100B☐ to finally become one.

Then, in the case where only one set of acceleration information and terminal identification information is received, the control section 110 determines whether or not the received acceleration information coincides with the acceleration information already transmitted in step S67 (step S72). In the case where the two pieces of acceleration information do not coincide with each other, the process is terminated. In the case where a coincidence is made, a notification of authentication is provided to the mating terminal (step S73). This triggers a connection setting process to start (step S74), and a predetermined connection sequence is performed to complete connection settings (step S75).

According to the third embodiment discussed above, the user can start to make settings for wireless communication with the desired terminal just by making a gesture of directing his/her terminal to the terminal with which it is desired to start wireless communication. This allows the user to start to make connection settings through an intuitive operation since it is only necessary to make the direction of the terminal with which it is desired to actually start wireless communication and the direction of the gesture coincide with each other.

Further, according to the embodiment, as in the second embodiment, even in the case where the device with which it is desired to perform wireless communication is an immovable device, connection settings for wireless communication can be made without taking the trouble of setting the SSID, inputting the PIN code, or the like.

In the embodiment, the GPS is used as the position information detection section. However, the present disclosure is not limited thereto. For example, the present disclosure may also be applied to a technique in which position measurement is performed using information transmitted through a radio wave transmitted from a base station in addition to radio waves from GPS satellites. Moreover, a technique called A-GPS (Assisted GPS) may also be used. In the A-GPS, position measurement is performed using starting data acquired by a server and transmitted through a radio wave from a base station and a clock signal transmitted through radio waves from GPS satellites.

A sensor that can detect the orientation that the terminal is facing such as an electronic compass, for example, may be used as the position information detection section. The electronic compass detects terrestrial magnetism to acquire the orientation that the compass itself is facing as an orientation angle from the magnetic north. In the case where the electronic compass is used as the position information detection section, acceleration information may not be included in the information transmitted as superposed on a beacon by the cellular phone terminal device 100B☐ to which a gesture is input. This is because transmitting a flag or the like indicating the presence or absence of an input gesture, in place of acceleration information, along with position information enables the terminal which receives the flag to determine whether or not the gesture is made toward the terminal.

5. Fourth Embodiment

5-1. Overview of Configuration of and Process Performed by Communication System Next, an overview of the configuration of and the process performed by a communication system 1γ according to a fourth embodiment of the present disclosure will be described with reference to FIGS. 18A-18C. The communication system 1γ according to the embodiment is formed by a cellular phone terminal device 100Bγ and an access point 200. Both the cellular phone terminal device 100Bγ and the access point 200 supports the WPS, and connection settings for wireless communication are made using the "PIN Code Method" for the WPS.

Figure 18A:
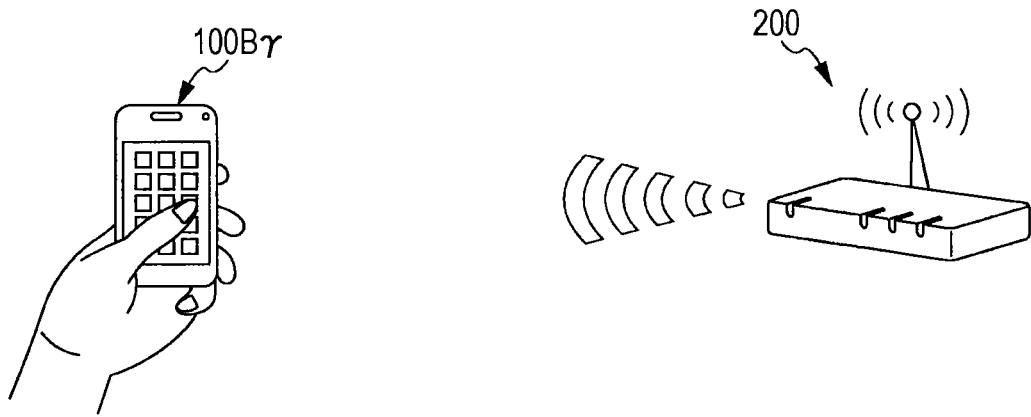
FIGS. 18A-18C are diagrams showing an example of the configuration of and the process performed by a communication system according to a fourth embodiment of the present disclosure.
Figure 18B:
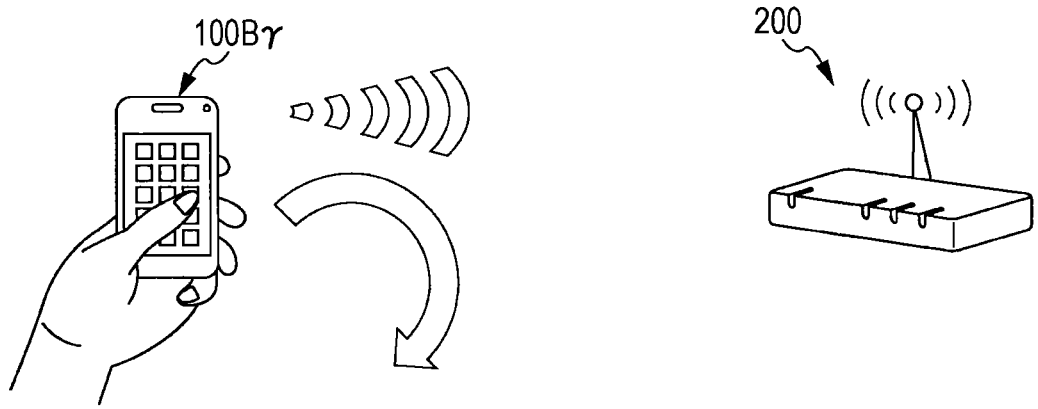

First, when a command to start to make connection settings for wireless communication is input by the user via a predetermined user interface or the like, an SSID is transmitted as superposed on a beacon from the access point 200 to the cellular phone terminal device 100Bγ as shown in FIG. 18A. When the beacon is received, a gesture determined in advance as the gesture for starting to make settings for wireless connection is input to the cellular phone terminal device 100Bγ. Then, the cellular phone terminal device 100Bγ is triggered upon input of the gesture to transmit acceleration information corresponding to the content of the gesture and terminal identification information on the cellular phone terminal device 100Bγ as superposed on a beacon as shown in FIG. 18B.

Figure 18C:
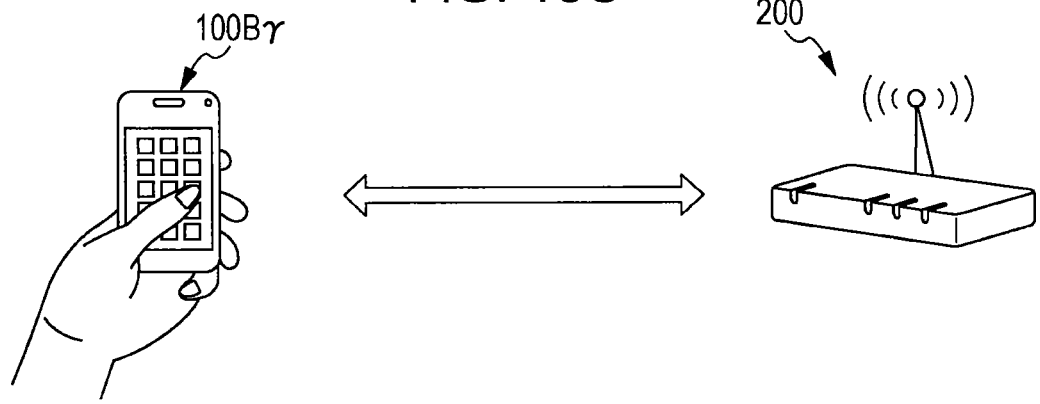

In the access point 200, in the case where it is determined that the received acceleration information coincides with an acceleration pattern determined in advance, the cellular phone terminal device 100Bγ is registered in a registrar provided in the access point 200 (see FIG. 18C). That is, a data link is established between the access point 200 and the cellular phone terminal device 100Bγ, thereby enabling transmission of data frames.

Figure 19:
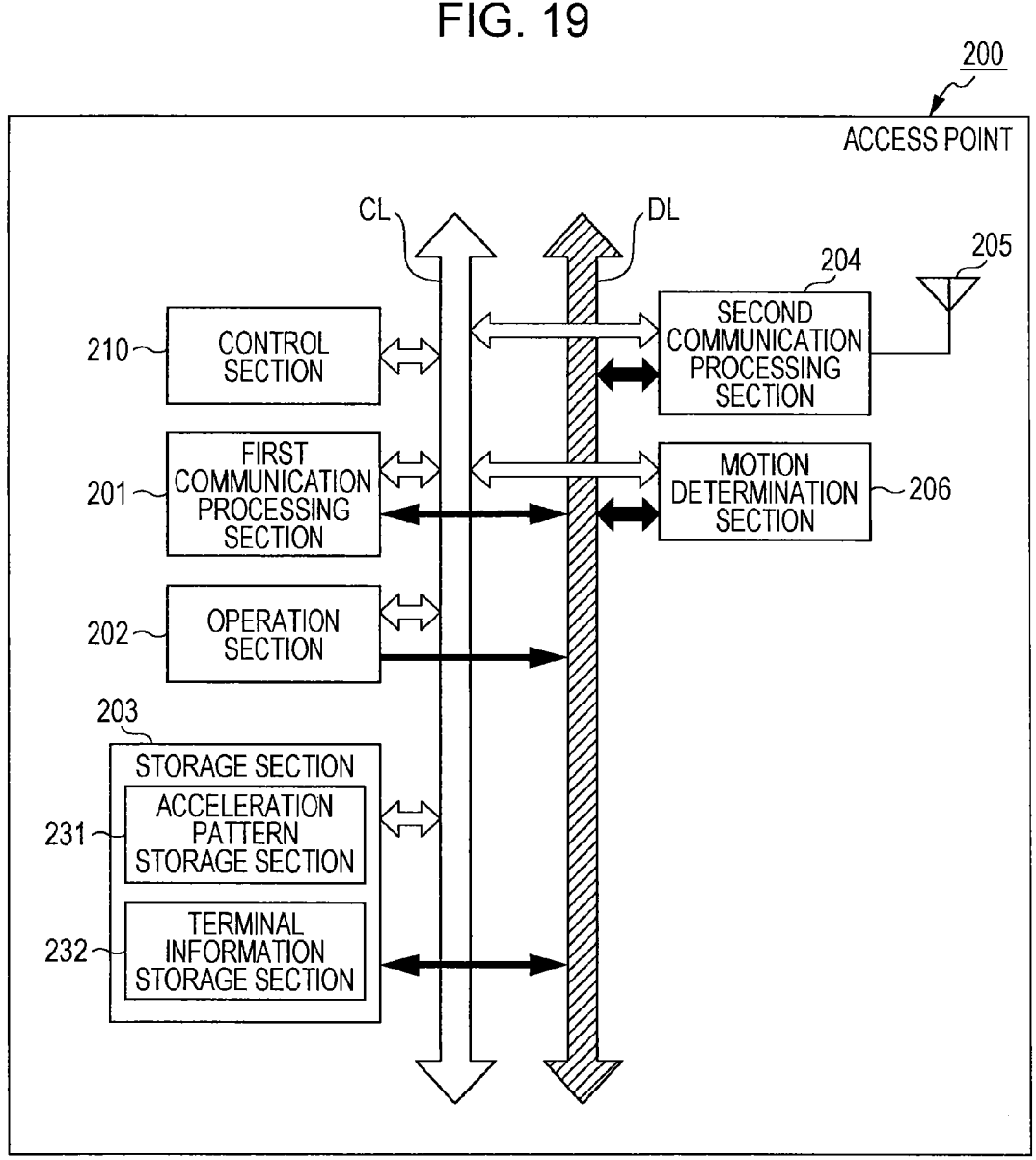
FIG. 19 is a block diagram showing an example of the configuration of an access point according to the fourth embodiment of the present disclosure.

5-2. Overview of Configuration of and Process Performed by Communication System Next, an example of the configuration of the access point 200 and the cellular phone terminal device 100Bγ will be described with reference to FIGS. 19 and 20. First, an example of the configuration of the access point 200 will be described with reference to FIG. 19. The access point 200 includes a control section 210 formed by a CPU or the like, a first communication processing section 201 that controls data transmission and reception between a wired LAN and a wireless LAN, and an operation section 202 formed by a button, a switch, or the like.

The access point 200 also includes a storage section 203 formed by a non-volatile memory or the like, a second communication processing section 204 to which an antenna 205 for second communication is connected, and a motion determination section 206. The storage section 203 includes an acceleration pattern storage section 231 that stores an acceleration pattern corresponding to the content of a gesture determined in advance as the gesture for starting to make settings for wireless connection, and a terminal information registration section 232 serving as a registrar in which received terminal identification information on a different terminal is registered.

The motion determination section 206 checks whether acceleration information transmitted from a terminal coincides with the acceleration pattern stored in the acceleration pattern storage section 231. In the case where the two pieces of acceleration information coincide with each other, the motion determination section 206 authenticates the mating terminal to register the mating terminal in the terminal information registration section 232.

Figure 20:
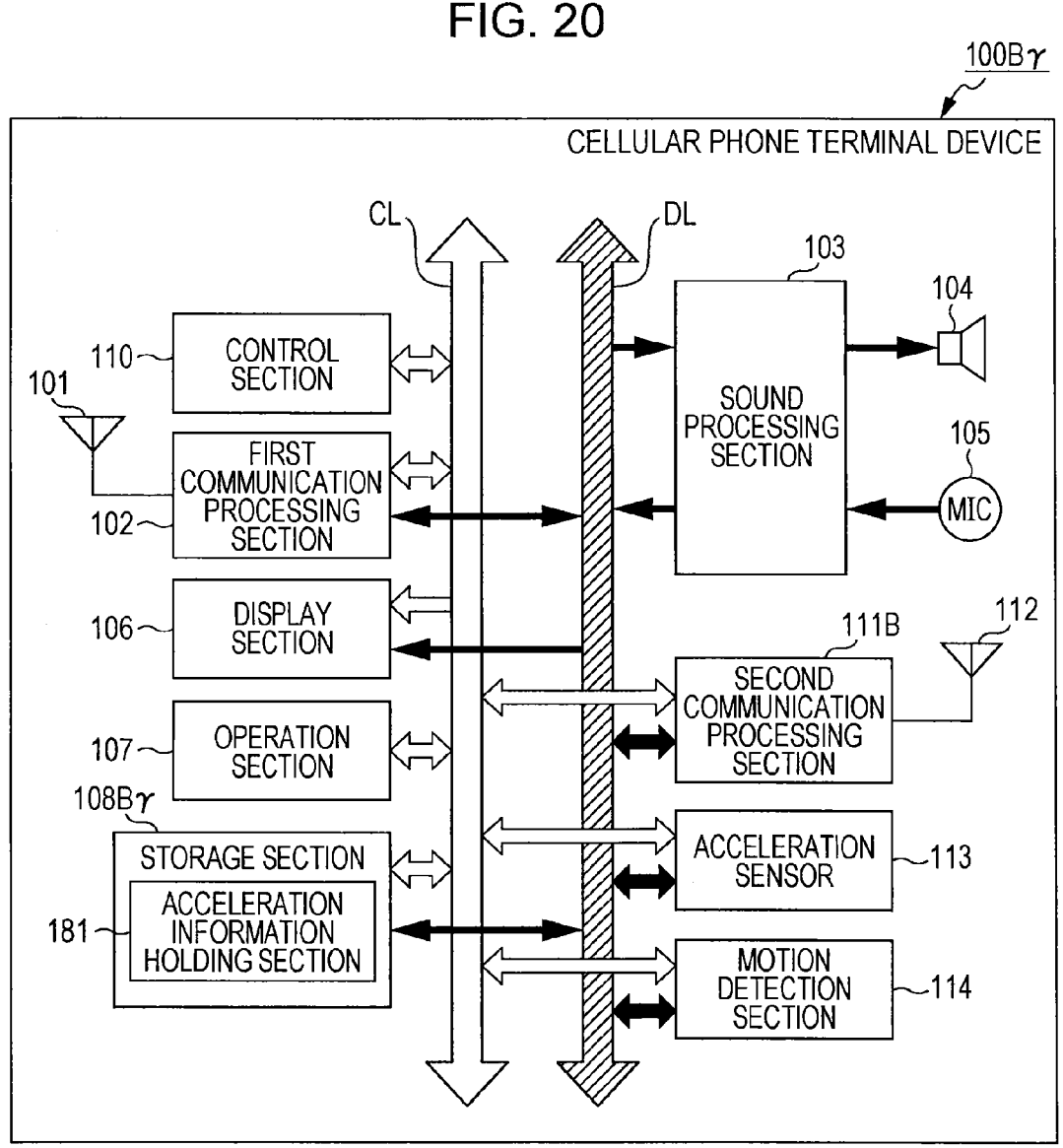
FIG. 20 is a block diagram showing an example of the configuration of a cellular phone terminal device according to the fourth embodiment of the present disclosure.

Next, an example of the configuration of the cellular phone terminal device 100Bγ will be described with reference to FIG. 20. Constituent components in FIG. 20 corresponding to those in FIGS. 3, 7, 11, and 15 are denoted by the same reference symbols to omit overlapping description. The cellular phone terminal device 100Bγ according to the embodiment includes the second communication processing section 111B, the acceleration sensor, the motion detection section 114 which detects that a predetermined gesture is input from the user, and the acceleration information holding section 181 which temporarily holds acquired acceleration information. The second communication processing section 111B transmits the detected acceleration information and terminal identification information on the terminal device 100Bγ as superposed on a beacon in the case where the motion detection section 114 detects that the predetermined gesture is input by the user.

5-3. Example of Information Processing Performed by Communication System

Figure 21:
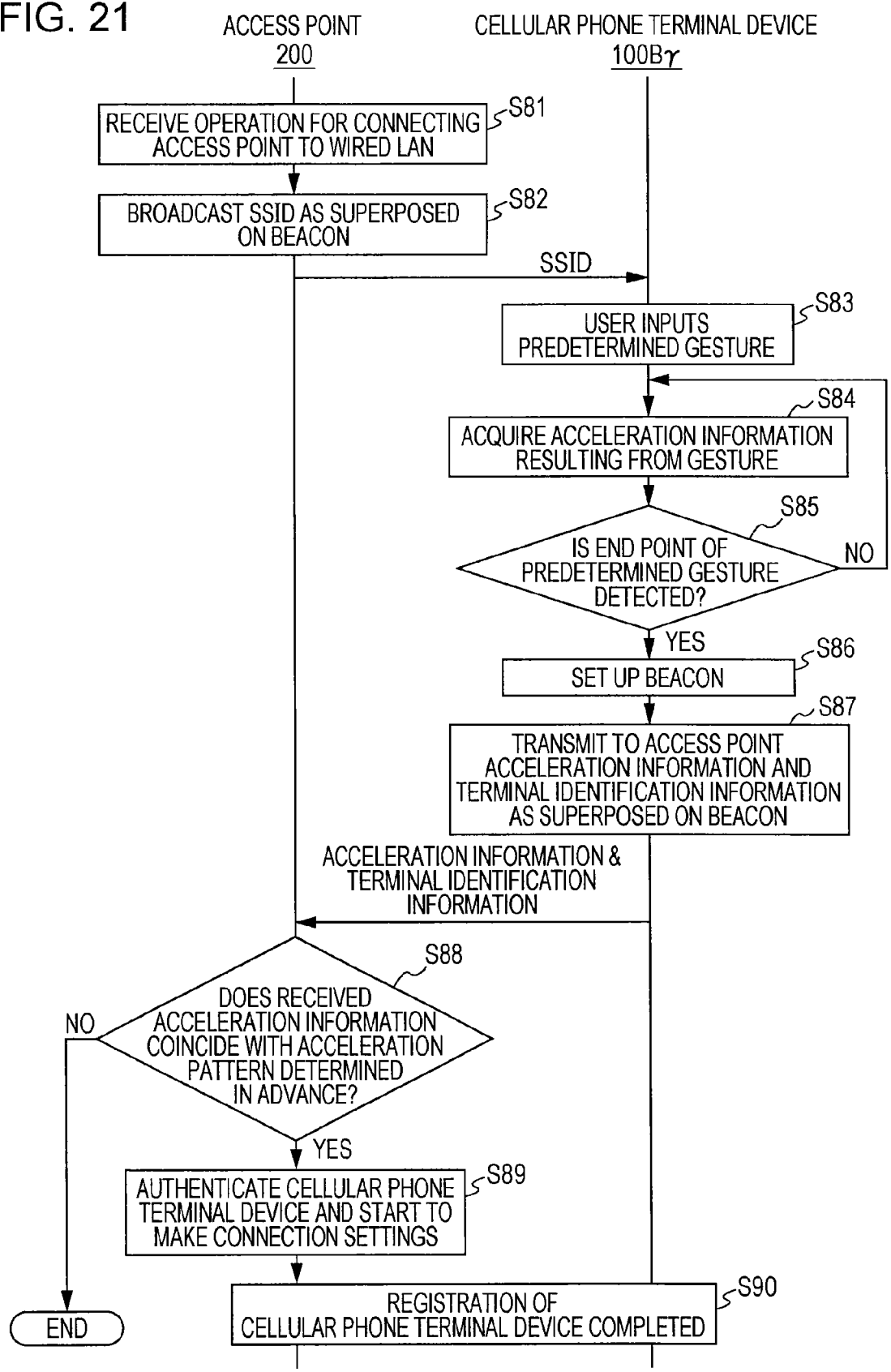
FIG. 21 is a flowchart showing an example of the process performed by the communication system according to the fourth embodiment of the present disclosure.

Next, an example of information processing performed by the communication system 1γ according to the embodiment will be described with reference to FIG. 21. FIG. 21 is a flowchart showing an example of the process performed between the cellular phone terminal device 100Bγ and the access point 200. First, when the access point 200 is connected to a wired LAN or turned on while connected to a wired LAN (step S81), the SSID which is the network name of the access point is broadcast as superposed on a beacon (step S82).

In the cellular phone terminal device 100Bγ, when the SSID is received, a predetermined gesture is subsequently input by the user (step S83), and an acceleration value resulting from the gesture is acquired by the acceleration sensor 113 (see FIG. 20). The acquired acceleration value is converted into acceleration information by the motion detection section 114 (step S84). Then, the motion detection section 114 determines whether or not the end point of the gesture is detected (step S85). The procedure returns to step S84 to continue the process until the end point is detected.

In the case where the end point of the gesture is detected, the second communication processing section 111B sets up a beacon (step S86), and transmits the acceleration information acquired in step S84 and terminal identification information on the terminal device 100Bγ as superposed on the beacon (step S87).

In the access point 200, the control section 210 determines whether or not the received acceleration information coincides with the acceleration pattern stored in the acceleration pattern storage section 231 (step S88). In the case where a coincidence is not made, the process is terminated. In the case where the received acceleration information coincides with the acceleration pattern, the cellular phone terminal device 100Bγ is authenticated to be registered in the terminal information registration section 232 (step S89). Consequently, connection settings for wireless communication are completed (step S90).

According to the fourth embodiment discussed above, connection settings can be made more easily, even for a device that already supports a scheme that facilitates making connection settings such as the WPS, utilizing such a scheme. That is, it is possible to start wireless connection with the desired device without taking the troublesome procedures such as inputting the PIN code.

In the embodiment, connection settings are made using the "PIN Code Method" for the WPS. However, connection settings may be made through other methods such as the "Push Button Method".

Alternatively, the present disclosure may also be applied to other standards for connection setting provided under the names "AOSS (AirStation One-Touch Secure System; trademark)", "Easy Wireless Start", and so forth.

6. Various Modifications

Figure 22:
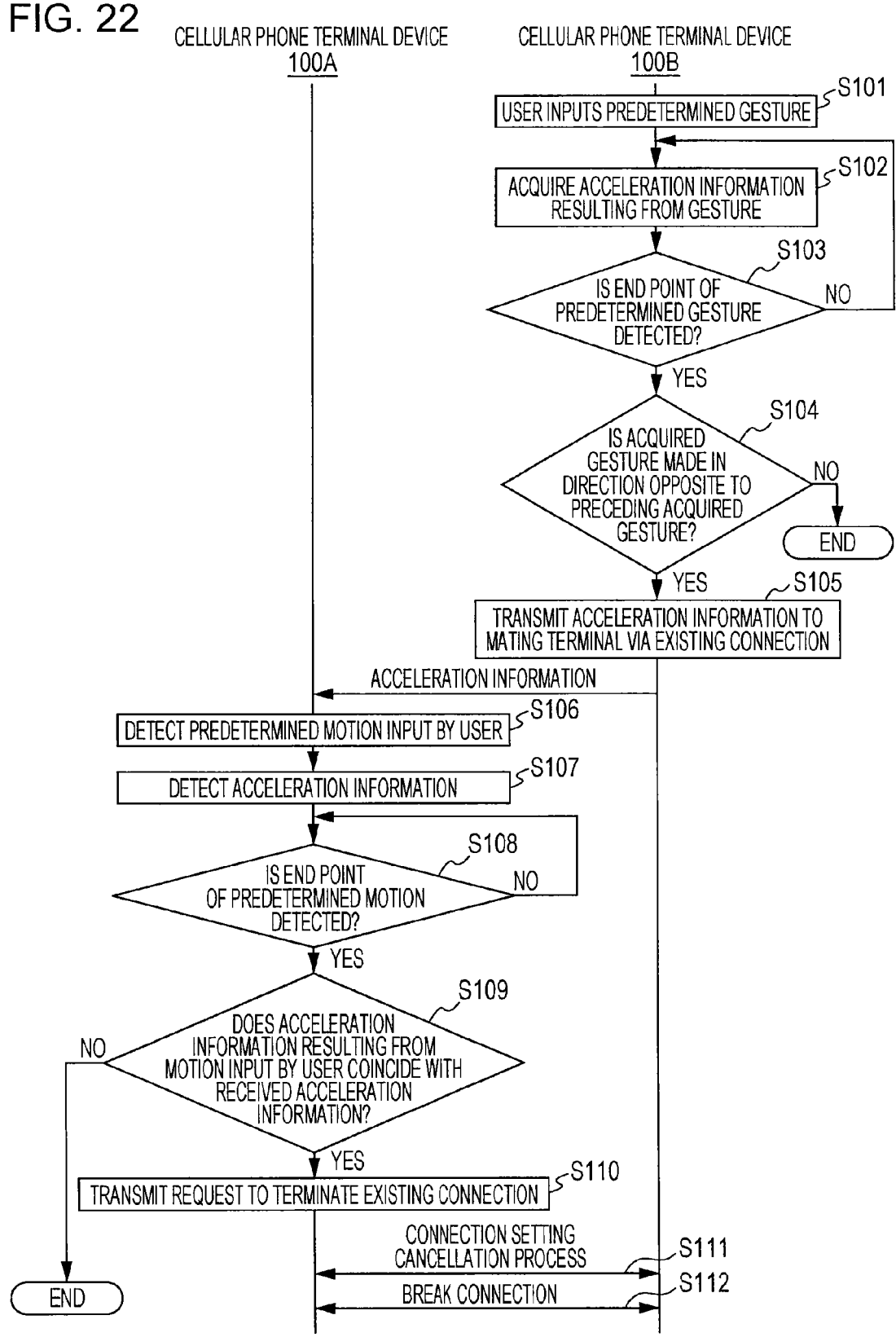
FIG. 22 is a flowchart showing an example of the process performed by a communication system according to a modification of the present disclosure.

In the embodiments discussed above, connection settings for starting wireless communication with the desired mate are to be made. However, the present disclosure is not limited thereto. For example, wireless connection settings (association) may be canceled in the case where a gesture in the direction opposite to the gesture for starting to make settings for wireless connection is input. An example of information processing performed between the cellular phone terminal device 100A (see FIG. 2) and the cellular phone terminal device 100B (see FIG. 3) in such a case is shown in the flowchart of FIG. 22.

First, when a predetermined gesture is input to the cellular phone terminal device 100B (step S101), an acceleration value resulting from the gesture is acquired by the acceleration sensor 113 (see FIG. 3), and converted into acceleration information (third acceleration information) by the motion detection section 114 (step S102). Then, the motion detection section 114 determines whether or not the end point of the gesture is detected (step S103). The procedure returns to step S102 to continue the process until the end point is detected.

In the case where the end point of the gesture is detected, it is determined whether or not the detected gesture is made in the direction opposite to the preceding input gesture (step S104). That is, a comparison is made between the acceleration information obtained from the currently input gesture and the preceding obtained acceleration information to determine whether the directions of the gestures are opposite to each other. For example, in the case where a gesture of swinging a terminal downward from above the head is input the last time, a gesture of swinging the terminal upward to above the head is determined as the gesture made in the opposite direction.

In the case where the preceding input gesture and the currently input gesture are not made in the directions opposite to each other, the process is terminated. In the case where the preceding input gesture and the currently input gesture are made in the directions opposite to each other, the acceleration information acquired in step S102 is transmitted to the mating terminal via an existing established connection (step S105).

In the cellular phone terminal device 100A, when a predetermined gesture input by the user is detected (step S106), an acceleration value resulting from the gesture is acquired by the acceleration sensor 113, and converted into acceleration information by the motion detection section 114 (step S107). Subsequently, it is determined whether or not the end point of the gesture is detected (step S108). The process in step S107 is continued while the end point of the gesture is not detected.

In the case where the end point of the gesture is detected, the motion determination section 115 determines whether or not the acquired acceleration information and the acceleration information transmitted from the mating terminal via the existing connection coincide with each other (step S109). In the case where the two pieces of acceleration information do not coincide with each other, the process is terminated. In the case where the two pieces of acceleration information coincide with each other, a request to cancel the wireless connection settings (association) is transmitted to the mating terminal via the existing connection (step S110). A process of canceling the connection settings is performed on the basis of this request (step S111) to break the connection between the cellular phone terminal devices 100A and 100B (step S112).

According to the modification discussed above, the user can cancel the established association just by inputting a gesture in the direction opposite to the gesture made to start wireless connection settings. That is, connection settings can also be canceled through an easy and significantly intuitive operation.

In the modification discussed above, a gesture in the direction opposite to the gesture made to start connection settings is input to cancel association. However, the present disclosure is not limited thereto. Any gesture that is input while a data link is established and that may be the same as or different from the gesture made to start connection settings may be considered as the gesture for canceling the settings, and may be used to cancel the settings.

In the embodiments discussed above, a wireless connection process is performed on the basis of the Wi-Fi Direct specification. However, other wireless communication standards may also be used. For example, various standards specified as IEEE 802.11 and standards such as Bluetooth, Wireless HD (High Definition), WiGig (Wireless Gigabit), WHDI (Wireless Home Digital Interface), infrared communication, and NFC (Near Field Communication) may also be used.

The sequence of processes in the embodiments discussed above may be executed by means of software as well as by means of hardware. In the case where the sequence of processes is executed by means of software, the software may be executed by a computer in which a program constituting the software is incorporated in dedicated hardware, or by a computer in which a program for executing various functions is installed.

A storage medium that stores program codes of software that implements the functions according to the embodiments discussed above may be supplied to a system or a device. It should be understood that the functions are also implemented by a computer (or a control device such as a CPU) of the system or the device by reading and executing the program codes stored in the storage medium.

In this case, examples of the storage medium which supplies the program codes include a flexible disk, a hard disk, an optical disc, a magneto-optical disk, a CD-ROM, a CD-R, a magnetic tape, a non-volatile memory card, and a ROM.

The functions according to the embodiments discussed above are implemented by the computer by reading and executing the program codes. In addition, an OS etc. that operates on the computer may perform part or all of the actual processes on the basis of commands according to the program codes. The present disclosure also includes a case where the functions according to the embodiments discussed above are implemented by the processes.

Process steps defining chronological processes described herein include processes to be performed chronologically in accordance with the order of description, and processes that may not necessarily be performed chronologically but that may be executed in parallel or individually (for example, parallel processes or processes performed by objects).

The configurations and the processes described in the claims of the present disclosure are not limited to the embodiments discussed above. It should be understood as a matter of course by those skilled in the art that various modifications, combinations, and other embodiments may occur depending on design requirements and other factors insofar as they are within the scope of the appended claims or the equivalents thereof.

The present disclosure may be configured as follows.

(1) A communication apparatus including:

a communication processing section that controls wireless communication performed with a different device;

a displacement sensor that detects an amount of displacement;

a motion detection section that detects that a predetermined motion is input to the communication apparatus by a user on the basis of the amount of displacement detected by the displacement sensor to output displacement information corresponding to the predetermined motion;

a motion determination section that compares first displacement information which is the displacement information output from the motion detection section and second displacement information acquired via the communication processing section to determine whether the first displacement information and the second displacement information coincide with each other; and a control section that causes the communication processing section to start to make connection settings required to establish a data link with the different device in the case where it is determined that a difference between the first displacement information and the second displacement information falls within a predetermined range.

(2) The communication apparatus according to (1), in which the communication processing section transmits the first displacement information as superimposed on a signal that carries a notification of presence of the apparatus or a response.

(3) The communication apparatus according to (1) or (2), in which the communication processing section sets up the signal at a timing when the predetermined motion made by the user is detected by the displacement sensor.

(4) The communication apparatus according to any one of (1) to (3), in which the communication processing section makes the connection settings using terminal identification information on the different device transmitted along with the second displacement information.

(5) (First embodiment; FIGS. 1 to 4) The communication apparatus according to any one of (1) to (4), in which the second displacement information is generated on the basis of a motion input to the different device by a user.

(6) (Modification of first embodiment; FIGS. 5 to 8) The communication apparatus according to claim 4, in which the communication processing section receives additional information transmitted from the different device along with the second displacement information and indicating a content of a motion, and the control section causes the communication processing section to start to make the connection settings in the case where the motion determination section determines that a difference between a displacement pattern generated on the basis of the additional information and the first displacement information falls within a predetermined range.

(7) (Second embodiment; FIGS. 9 to 12) The communication apparatus according to any one of (1) to (4), in which the second displacement information is transmitted from the different device which receives the first displacement information transmitted from the communication apparatus in the case where the different device determines that a difference between the first displacement information and a predetermined displacement pattern set in advance falls within a predetermined range.

(8) (Third embodiment; FIGS. 13 to 17) The communication apparatus according to any one of (1) to (4), further including:

a position detection section that acquires position information on the communication apparatus, in which the communication processing section transmits along with the first displacement information the position information detected by the position detection section along with a predetermined motion input by the user, and the second displacement information is transmitted from the different device in the case where the different device which receives the first displacement information and the position information transmitted from the communication apparatus determines that a motion indicated by the first displacement information and the position information is made in a direction in which the apparatus is positioned.

(9) (Third embodiment; FIGS. 13 to 17; a case where a recipient calculates the direction in which a gesture is made) The communication apparatus according to (8), in which the position information transmitted to the different device includes position information acquired at a start point and an end point of the predetermined motion input by the user.

(10) (Third embodiment; FIGS. 13 to 17; a case where a recipient does not calculate the direction in which a gesture is made) The communication apparatus according to (8), in which the position information transmitted to the different device is a flag value indicating presence or absence of the predetermined motion input by the user.

(11) (Modification; FIG. 22) The communication apparatus according to any one of (1) to (4), in which the motion determination section compares third displacement information, which is displacement information generated on the basis of a predetermined motion input to the communication apparatus by the user with the data link established, and the first displacement information generated when starting to make the connection settings, and the control section causes the communication processing section to cancel the data link in the case where the motion determination section determines that a direction of the predetermined motion indicated by the third displacement information is opposite to that of the predetermined motion indicated by the first displacement information.

(12) (Fourth embodiment <embodiment of AP; FIGS. 18 to 21>; independent claim) A communication apparatus including:

a communication processing section that controls wireless communication performed with a different device;

a motion determination section that determines whether a predetermined displacement pattern set in advance and second displacement information acquired via the communication processing section coincide with each other; and a control section that causes the communication processing section to start to make connection settings required to establish a data link with the different device in the case where it is determined that a difference between the first displacement information and the second displacement information falls within a predetermined range.

(13) A communication method including:

detecting an amount of displacement;

detecting that a predetermined motion is input to the communication apparatus by a user on the basis of the detected amount of displacement to output displacement information corresponding to the predetermined motion;

comparing first displacement information which is the displacement information and second displacement information which is displacement information transmitted from a different device; and starting to make connection settings required to establish a data link with the different device in the case where a difference between the first displacement information and the second displacement information falls within a predetermined range.

(14) A program that causes a computer to:
detect an amount of displacement;
detect that a predetermined motion is input to the communication apparatus by a user on the basis of the detected amount of displacement to output displacement information corresponding to the predetermined motion;
compare first displacement information which is the displacement information and second displacement information which is displacement information transmitted from a different device; and
start to make connection settings required to establish a data link with the different device in the case where a difference between the first displacement information and the second displacement information falls within a predetermined range.

The invention claimed is:
1. An information processing apparatus comprising:
circuitry configured to
receive, from another information processing apparatus, first displacement information corresponding to movement of the another information processing apparatus;
sense second displacement information corresponding to movement of the information processing apparatus;
determine whether the first displacement information and the second displacement information indicate that the movement of the another information processing apparatus and the movement of the information processing apparatus are performed separately and have a predetermined relationship; and
establish a connection with the another information processing apparatus when the first displacement information and the second displacement information indicate that the movement of the another information processing apparatus and the movement of the information processing apparatus are performed separately and have the predetermined relationship.

2. The information processing apparatus of claim 1, wherein the circuitry is configured to determine a difference between the first displacement information and the second displacement information and to establish the connection with the another information processing apparatus when the difference is less than a predetermined threshold.

3. The information processing apparatus of claim 1, wherein the circuitry is configured to determine that a predetermined motion is applied to the information processing apparatus based on an amount of the movement of the information processing apparatus, and to generate the second displacement information based on the determination.

4. The information processing apparatus of claim 1, wherein the first displacement information is included in a signal transmitted from the another information processing apparatus that notifies a presence of the another information processing apparatus.

5. The information processing apparatus of claim 4, wherein the signal includes identification information corresponding to the another information processing apparatus.

6. The information processing apparatus of claim 5, wherein the circuitry is configured to determine a difference between the first displacement information and the second displacement and to authenticate the another information processing apparatus based on the identification information corresponding to the another information processing apparatus when the difference is less than a predetermined threshold.

7. The information processing apparatus of claim 6, wherein the circuitry is configured to transmit, to the another information processing apparatus, identification information corresponding to the information processing apparatus based on a result of the authentication.

8. The information processing apparatus of claim 5, wherein the signal includes display information instructing an operation of a user of the information processing apparatus to move the information processing apparatus.

9. The information processing apparatus of claim 8, wherein the displayed information instructs the user to move the information processing apparatus in a direction that is reverse from a direction of the movement of the second information processing apparatus indicated by the first displacement information.

10. The information processing apparatus of claim 9, wherein the circuitry is configured to determine whether a second pattern corresponding to the second displacement information is the reverse of a first pattern corresponding to the first displacement information and to authenticate the another information processing apparatus based on the identification information corresponding to the another information processing apparatus when it is determined that the second pattern is the reverse of the first pattern.

11. The information processing apparatus of claim 10, wherein the circuitry is configured to transmit, to the another information processing apparatus, identification information corresponding to the information processing apparatus based on a result of the authentication.

12. The information processing apparatus of claim 1, wherein the circuitry is configured to transmit, to the another information processing apparatus, the second displacement information.

13. The information processing apparatus of claim 12, wherein the second displacement information is included in a signal transmitted from the information processing apparatus to the another information processing apparatus that notifies a presence of the information processing apparatus.

14. The information processing apparatus of claim 13, wherein the signal includes identification information corresponding to the information processing apparatus.

15. The information processing apparatus of claim 1, wherein the circuitry is configured to receive a signal transmitted from the another information processing apparatus including the first displacement information and identification information corresponding to the another information processing apparatus, wherein the first displacement information is the same as the second displacement information included in the signal transmitted from the information processing apparatus to the another information processing apparatus.

16. The information processing apparatus of claim 15, wherein the circuitry is configured to determine a difference between the first displacement information and the second displacement and to perform authenticates the another information processing apparatus based on the identification information corresponding to the another information processing apparatus when the difference is less than a predetermined threshold.

17. The information processing apparatus of claim 16, wherein the circuitry is configured to transmit, to the another information processing apparatus, information indicating a result of the authentication.

18. A method performed by an information processing apparatus, the method comprising:
- receiving, at circuitry of the information processing apparatus, from another information processing apparatus, first displacement information corresponding to movement of the another information processing apparatus;
- sensing, in the circuitry, second displacement information corresponding to movement of the information processing apparatus;
- determining, in the circuitry, whether the first displacement information and the second displacement information indicate that the movement of the another information processing apparatus and the movement of the information processing apparatus are performed separately and have a predetermined relationship; and
- establishing a connection of the circuitry with the another information processing apparatus when the first displacement information and the second displacement information indicate that the movement of the another information processing apparatus and the movement of the information processing apparatus are performed separately and have the predetermined relationship.

19. A non-transitory computer-readable medium including computer program instructions, which when executed by an information processing apparatus, cause the information processing apparatus to:
- receive, from another information processing apparatus, first displacement information corresponding to movement of the another information processing apparatus;
- sense second displacement information corresponding to movement of the information processing apparatus;
- determining whether the first displacement information and the second displacement information indicate that the movement of the another information processing apparatus and the movement of the information processing apparatus are performed separately and have a predetermined relationship; and
- establish a connection with the another information processing apparatus when the first displacement information and the second displacement information indicate that the movement of the another information processing apparatus and the movement of the information processing apparatus are performed separately and have the predetermined relationship.

* * * * *